(12) United States Patent
van Dok et al.

(10) Patent No.: US 9,739,632 B2
(45) Date of Patent: Aug. 22, 2017

(54) METHODS AND SYSTEMS OF PROVIDING INFORMATION USING A NAVIGATION APPARATUS

(71) Applicant: TOMTOM INTERNATIONAL B.V., Amsterdam (NL)

(72) Inventors: Cornelis Klaas van Dok, Kudelstaart (NL); Sijtse Thomas Goverts, Haarlem (NL)

(73) Assignee: TomTom Navigation B.V., Amsterdam (NL)

( * ) Notice: Subject to any disclaimer, the term of this patent is extended or adjusted under 35 U.S.C. 154(b) by 0 days.

(21) Appl. No.: 14/436,521

(22) PCT Filed: Oct. 17, 2013

(86) PCT No.: PCT/EP2013/071801
§ 371 (c)(1),
(2) Date: Apr. 17, 2015

(87) PCT Pub. No.: WO2014/060559
PCT Pub. Date: Apr. 24, 2014

(65) Prior Publication Data
US 2015/0247737 A1    Sep. 3, 2015

(30) Foreign Application Priority Data

Oct. 17, 2012   (GB) .................................. 1218681.3

(51) Int. Cl.
*G01C 21/36*          (2006.01)
(52) U.S. Cl.
CPC ....... *G01C 21/367* (2013.01); *G01C 21/3691* (2013.01); *G01C 21/3697* (2013.01)

(58) Field of Classification Search
CPC .............. G01C 21/3691; G01C 21/367; G01C 21/3697; G01C 21/26; G01C 21/3694;
(Continued)

(56) References Cited

U.S. PATENT DOCUMENTS 5,612,881 A   3/1997 Moroto et al.
5,694,122 A   12/1997 Nakada
(Continued)

FOREIGN PATENT DOCUMENTS

CN    1995919 A    7/2007
CN    101776455 A  7/2010
(Continued)

OTHER PUBLICATIONS

International Search Report of International Application No. PCT/EP2007/060303 dated Jan. 18, 2008.
(Continued)

*Primary Examiner* — Nga X Nguyen

(57) ABSTRACT

A method of providing information relating to a path being travelled using a navigation apparatus, involves displaying a path bar including a linear representation of at least a portion of a path to be travelled using a navigation apparatus. The linear representation of the portion of the path is scrollable in the display window by a user to reveal a linear representation of another portion of the path. The method may involve automatically increasing a scale of the linear representation of the path displayed as a given location represented along the path is approached, wherein the location is a location of a safety camera or event affecting traffic flow along the path.

16 Claims, 7 Drawing Sheets

(58) Field of Classification Search
CPC ............. G08G 1/005; G08G 1/096838; G08G 1/096861; G08G 1/096883; G08G 1/096827
USPC ......................................... 701/431, 538, 455
See application file for complete search history.

(56) References Cited

U.S. PATENT DOCUMENTS

| | | | |
|---|---|---|---|
| 5,831,552 A | 11/1998 | Sogawa et al. | |
| 5,864,305 A | 1/1999 | Rosenquist | |
| 5,877,751 A | 3/1999 | Kanemitsu et al. | |
| 6,006,161 A * | 12/1999 | Katou | G08G 1/0969 340/988 |
| 6,014,606 A | 1/2000 | Tu | |
| 6,256,577 B1 | 7/2001 | Granuke | |
| 6,346,942 B1 | 2/2002 | Endo et al. | |
| 6,680,674 B1 | 1/2004 | Park | |
| 6,760,661 B2 | 7/2004 | Klein et al. | |
| 6,820,003 B2 | 11/2004 | Ueno | |
| 6,898,519 B1 | 5/2005 | Schilling | |
| 6,922,629 B2 | 7/2005 | Yoshikawa et al. | |
| 6,954,696 B2 | 10/2005 | Ihara et al. | |
| 7,027,917 B2 | 4/2006 | Ikeda | |
| 7,289,904 B2 | 10/2007 | Uyeki | |
| 7,609,176 B2 | 10/2009 | Endo et al. | |
| 7,613,566 B1 | 11/2009 | Bolton | |
| 8,825,402 B2 | 9/2014 | Hayashi | |
| 2003/0225508 A9 | 12/2003 | Petzold et al. | |
| 2004/0204845 A1* | 10/2004 | Wong | G01C 21/3694 701/431 |
| 2004/0220727 A1 | 11/2004 | Adachi | |
| 2005/0049779 A1* | 3/2005 | Yasuda | G01C 21/3658 701/455 |
| 2005/0149262 A1 | 7/2005 | Oikubo | |
| 2006/0058950 A1 | 3/2006 | Kato et al. | |
| 2006/0069500 A1 | 3/2006 | Hashizume | |
| 2006/0217881 A1 | 9/2006 | Pei et al. | |
| 2006/0220923 A1 | 10/2006 | Tanizaki et al. | |
| 2007/0192020 A1* | 8/2007 | Brulle-Drews | G01C 21/3647 701/532 |
| 2007/0225902 A1 | 9/2007 | Gretton et al. | |
| 2008/0088480 A1 | 4/2008 | Rozum et al. | |
| 2011/0313649 A1 | 12/2011 | Bales et al. | |
| 2012/0078513 A1 | 3/2012 | Oaki et al. | |
| 2012/0150436 A1 | 6/2012 | Rossano et al. | |
| 2012/0200920 A1 | 8/2012 | Sanada et al. | |
| 2014/0114575 A1 | 4/2014 | Alders et al. | |

FOREIGN PATENT DOCUMENTS

| | | |
|---|---|---|
| DE | 10041800 A1 | 3/2002 |
| DE | 4445582 C1 | 5/2002 |
| DE | 10119730 A1 | 11/2002 |
| DE | 10204093 A1 | 12/2002 |
| DE | 10131432 A1 | 1/2003 |
| DE | 10200883 A1 | 1/2003 |
| DE | 10233376 A | 2/2004 |
| EP | 0703525 A1 | 3/1996 |
| EP | 1271104 A2 | 1/2003 |
| EP | 1389728 A1 | 2/2004 |
| EP | 1403835 A1 | 3/2004 |
| EP | 1087359 B1 | 11/2004 |
| EP | 1533592 A1 | 5/2005 |
| EP | 2372311 A2 | 10/2011 |
| EP | 2434257 A2 | 3/2012 |
| GB | 2492379 A | 1/2013 |
| JP | H06-300576 A | 10/1994 |
| JP | H08-128838 A | 5/1996 |
| JP | H09-061179 A | 3/1997 |
| JP | 2001304882 A1 | 10/2001 |
| JP | 2003148972 A | 5/2003 |
| JP | 200469691 A | 3/2004 |
| JP | 2005241519 A | 9/2005 |
| TW | 200509001 A | 3/2005 |
| TW | 200634676 A | 10/2006 |
| WO | 2012089265 A1 | 7/2012 |

OTHER PUBLICATIONS

International Search Report of International Application No. PCT/EP2013/071801 dated Dec. 19, 2013.
Search Report of United Kingdom Application No. GB1218681.3 dated Jan. 28, 2013.

* cited by examiner

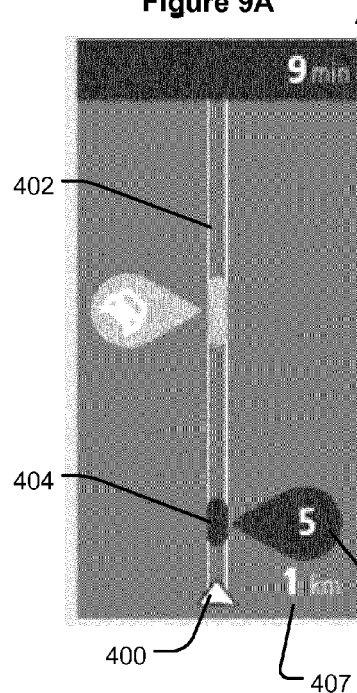
Figure 9A
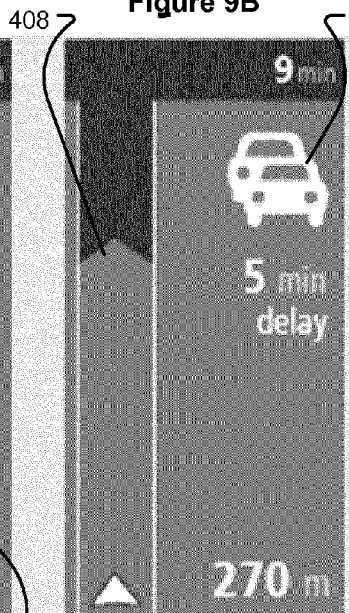
Figure 9B
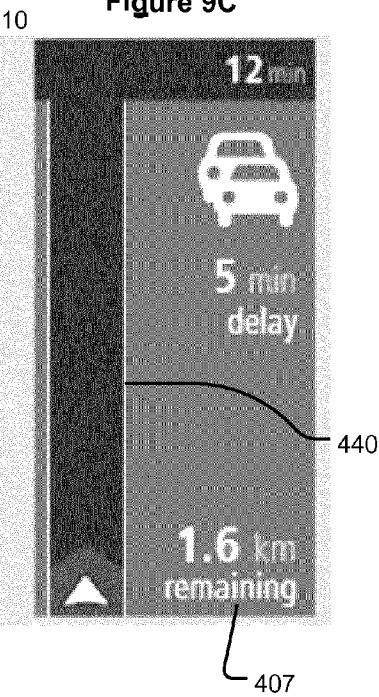
Figure 9C
Figure 9D    Figure 9E    Figure 9F

METHODS AND SYSTEMS OF PROVIDING INFORMATION USING A NAVIGATION APPARATUS

CROSS-REFERENCES TO RELATED APPLICATIONS

This application is the National Stage of International Application No. PCT/EP2013/071801, filed Oct. 17, 2013, and designating the United States. The application claims priority from United Kingdom Patent Application No. 1218681.3 filed Oct. 17, 2012. The entire content of these applications is incorporated herein by reference.

FIELD OF THE INVENTION

This invention relates to methods and systems for providing information to a user of a navigation apparatus. The invention also extends to a navigation apparatus arranged to carry out the methods of the present invention. Illustrative embodiments of the invention relate to navigation apparatus in the form of portable navigation devices, so-called PNDs, that include global navigation satellite signal reception and processing functionality, and to methods of operating such devices. The invention is also applicable to navigation apparatus which forms part of an integrated navigation system, e.g. an in-vehicle navigation system, and methods of operating the same.

BACKGROUND TO THE INVENTION

The present invention is directed to methods of providing information, such as travel, traffic or navigation information, to a user of a navigation apparatus, and to a navigation apparatus arranged for carrying out the steps of the methods in accordance with embodiments of the invention. The navigation apparatus may comprise navigation apparatus of any suitable form as discussed above, and in more detail below.

One illustrative embodiment of the apparatus is a portable navigation device. Portable navigation devices (PNDs) that include GPS (Global Positioning System) signal reception and processing functionality are well known and are widely employed as in-car or other vehicle navigation systems. In general terms, a modern PND comprises a processor, memory (at least one of volatile and non-volatile, and commonly both), and map data stored within said memory. The processor and memory cooperate to provide an execution environment in which a software operating system may be established, and additionally it is commonplace for one or more additional software programs to be provided to enable the functionality of the PND to be controlled, and to provide various other functions.

Typically these devices further comprise one or more input interfaces that allow a user to interact with and control the device, and one or more output interfaces by means of which information may be relayed to the user. Illustrative examples of output interfaces include a visual display and a speaker for audible output. Illustrative examples of input interfaces include one or more physical buttons to control on/off operation or other features of the device (which buttons need not necessarily be on the device itself but could be on a steering wheel if the device is built into a vehicle), and a microphone for detecting user speech. In a particularly preferred arrangement the output interface display may be configured as a touch sensitive display (by means of a touch sensitive overlay or otherwise) to additionally provide an input interface by means of which a user can operate the device by touch.

Devices of this type will also often include one or more physical connector interfaces by means of which power and optionally data signals can be transmitted to and received from the device, and optionally one or more wireless transmitters/receivers to allow communication over cellular telecommunications and other signal and data networks, for example Wi-Fi, Wi-Max GSM and the like. PND devices of this type also include a GPS antenna by means of which satellite-broadcast signals, including location data, can be received and subsequently processed to determine a current location of the device.

The PND device may also include electronic gyroscopes and accelerometers which produce signals that can be processed to determine the current angular and linear acceleration, and in turn, and in conjunction with location information derived from the GPS signal, velocity and relative displacement of the device and thus the vehicle in which it is mounted. Typically such features are most commonly provided in in-vehicle navigation systems, but may also be provided in PND devices if it is expedient to do so.

The utility of such PNDs is manifested primarily in their ability to determine a route between a first location (typically a start or current location) and a second location (typically a destination). These locations can be input by a user of the device, by any of a wide variety of different methods, for example by postcode, street name and house number, previously stored "well known" destinations (such as famous locations, municipal locations (such as sports grounds or swimming baths) or other points of interest), and favourite or recently visited destinations.

Typically, the PND is enabled by software for computing a "best" or "optimum" route between the start and destination address locations from the map data. A "best" or "optimum" route is determined on the basis of predetermined criteria and need not necessarily be the fastest or shortest route. The selection of the route along which to guide the driver can be very sophisticated, and the selected route may take into account existing, predicted and dynamically and/or wirelessly received traffic and road information, historical information about road speeds, and the drivers own preferences for the factors determining road choice (for example the driver may specify that the route should not include motorways or toll roads).

In addition, the device may continually monitor road and traffic conditions, and offer to or choose to change the route over which the remainder of the journey is to be made due to changed conditions. Real time traffic monitoring systems, based on various technologies (e.g. mobile phone data exchanges, fixed cameras, GPS fleet tracking) are being used to identify traffic delays and to feed the information into notification systems.

PNDs of this type may typically be mounted on the dashboard or windscreen of a vehicle, but may also be formed as part of an on-board computer of the vehicle radio or indeed as part of the control system of the vehicle itself. The navigation device may also be part of a hand-held system, such as a PDA (Portable Digital Assistant) a media player, a mobile phone or the like, and in these cases, the normal functionality of the hand-held system is extended by means of the installation of software on the device to perform both route calculation and navigation along a calculated route.

Route planning and navigation functionality may also be provided by a desktop or mobile computing resource running appropriate software. For example, TomTom International B.V. provides an on-line route planning and navigation facility at routes.tomtom.com, which facility allows a user to enter a start point and a destination whereupon the server to which the user's PC is connected calculates a route (aspects of which may be user specified) and generates a set of exhaustive navigation instructions for guiding the user from the selected start point to the selected destination.

In the context of a PND, once a route has been calculated, the user interacts with the navigation device to select the desired calculated route, optionally from a list of proposed routes. Optionally, the user may intervene in, or guide the route selection process, for example by specifying that certain routes, roads, locations or criteria are to be avoided or are mandatory for a particular journey. The route calculation aspect of the PND forms one primary function, and navigation along such a route is another primary function.

During navigation along a calculated route, it is usual for such PNDs to provide visual and/or audible instructions to guide the user along a chosen route to the end of that route, i.e. the desired destination. It is also usual for PNDs to display map information on-screen during the navigation, such information regularly being updated on-screen so that the map information displayed is representative of the current location of the device, and thus of the user or user's vehicle if the device is being used for in-vehicle navigation.

An icon displayed on-screen typically denotes the current device location, and is centred with the map information of current and surrounding roads in the vicinity of the current device location and other map features also being displayed. Additionally, navigation information may be displayed, optionally in a status bar above, below or to one side of the displayed map information, examples of navigation information include a distance to the next deviation from the current road required to be taken by the user, the nature of that deviation possibly being represented by a further icon suggestive of the particular type of deviation, for example a left or right turn. The navigation function also determines the content, duration and timing of audible instructions by means of which the user can be guided along the route. As can be appreciated a simple instruction such as "turn left in 100 m" requires significant processing and analysis. As previously mentioned, user interaction with the device may be by a touch screen, or additionally or alternately by steering column mounted remote control, by voice activation or by any other suitable method.

A further important function provided by the device is automatic route re-calculation in the event that: a user deviates from the previously calculated route during navigation (either by accident or intentionally); real-time traffic conditions dictate that an alternative route would be more expedient and the device is suitably enabled to recognize such conditions automatically, or if a user actively causes the device to perform route re-calculation for any reason.

It is also known to allow a route to be calculated with user defined criteria; for example, the user may prefer a scenic route to be calculated by the device, or may wish to avoid any roads on which traffic congestion is likely, expected or currently prevailing. The device software would then calculate various routes and weigh more favourably those that include along their route the highest number of points of interest (known as POIs) tagged as being for example of scenic beauty, or, using stored information indicative of prevailing traffic conditions on particular roads, order the calculated routes in terms of a level of likely congestion or delay on account thereof. Other POI-based and traffic information-based route calculation and navigation criteria are also possible.

Although the route calculation and navigation functions are fundamental to the overall utility of PNDs, it is possible to use the device purely for information display, or "free-driving", in which only map information relevant to the current device location is displayed, and in which no route has been calculated and no navigation is currently being performed by the device. Such a mode of operation is often applicable when the user already knows the route along which it is desired to travel and does not require navigation assistance.

Devices of the type described above, for example the GO 1005 LIVE model manufactured and supplied by TomTom International B.V., provide a reliable means for enabling users to navigate from one position to another.

During navigation along a pre-calculated route, information may be displayed to a user regarding events, such as traffic events, affecting the route to be travelled, or regarding POI associated with the route. For example, the location and severity of congestion or accidents along the route may be indicated.

In some arrangements, information of this type may be displayed to the user by adding appropriate icons to a "traffic bar", which is a linear representation of a remainder of the route still to be travelled, and starting at a current position. The traffic bar provides a way of keeping this information separate from the main 2D or 3D navigation map that is displayed of the region surrounding a current position, and gives an overview of any upcoming problems.

One such arrangement is described in the patent publication US 2007/0225902 A1, entitled "Navigation Device Displaying Dynamic Travel Information"; the entire contents of which is incorporated herein by reference. In the arrangements disclosed in US 2007/0225902 A1, the traffic bar is arranged to show the entire route to be travelled before travel along the route commences, i.e. when a current position corresponds to a start point of the pre-calculated route, or the entire remainder of the pre-calculated route to be travelled starting from a current position once travel along the route has commenced.

A similar arrangement is described in the patent publication WO 2008/083862 A1, entitled "Method of Indicating Traffic Delays, Computer Program and Navigation System Therefor"; the entire contents of which is again incorporated herein by reference. In the arrangements disclosed in WO 2008/083862 A1, the relevance of an event affecting the remainder of a route to be travelled is used to determine whether an icon indicative of the event is displayed. Once again, a schematic linear representation of the route is provided in a "traffic bar" separate from the main navigation map, upon which icons indicative of delay incidents affecting the route, and their severity, may be superposed. The traffic bar shows a representation of the entire route to be travelled before travel along the route commences, or the entire remainder of the route to be travelled once travel has commenced.

The Applicant has realised that there is a need for improved methods and systems for providing information to a user regarding a path, e.g. route, to be travelled.

SUMMARY OF THE INVENTION

In accordance with a first aspect of the invention there is provided a method of providing information relating to a path to be travelled using a navigation apparatus, the method comprising:

displaying a linear representation of a portion of a path to be travelled in a display window of the navigation apparatus, wherein the linear representation of the portion of the path is scrollable in the display window to reveal a linear representation of another portion of the path.

In accordance with a further aspect of the invention there is provided a navigation apparatus arranged to provide information relating to a path to be travelled, the apparatus comprising:

means for displaying a linear representation of a portion of a path to be travelled in a display window of the navigation apparatus, wherein the linear representation of the portion of the path is scrollable in the display window to reveal a linear representation of another portion of the path.

It will be appreciated that the invention in the second and further aspects may comprise any or all of the features described in respect of the method of the first aspect of the invention, and vice versa. Thus, if not explicitly stated, the method may comprise the steps of controlling the apparatus to perform any of the functions described in relation to the system or apparatus, and the system or apparatus of the invention may be arranged to perform any of the method steps herein described. The system or apparatus may comprise a set of one or more processors arranged to carry out the steps mentioned. Any step may be carried out by any one of the processors, or by multiple processors. It will be appreciated that the method may be a method of operating a navigation apparatus.

Thus, in accordance with the invention, a (linear representation of a) portion of a path to be travelled is displayed to a user in a display window of a navigation apparatus, but is scrollable (by a user) to reveal a linear representation of another portion of the path in the window. The term "scrollable" herein refers to the representation being scrollable by a user. In contrast to known methods and systems for providing a linear representation of a path to be travelled, rather than always showing the entire path to be travelled, or a remainder thereof once travel along the path has commenced, the present invention displays a representation of only a portion of the path at a time in a display window. This allows the user to scroll the displayed representation of a portion of path in the window to view a representation of another portion of the path initially hidden. The invention thus enables an overview of the path to be obtained, facilitating visualization of the path. The displayed representation of a portion of the path is scrollable to reveal a linear representation of another portion of the path in the display window. Thus upon scrolling of a displayed linear representation of a portion of the path, the representation of the other portion is displayed.

References to a "displayed portion of the path" or similar used for brevity herein refer to the displayed linear representation of a portion of the path unless the context demands otherwise. References to the "representation of the path" or similar should be understood as referring to the "linear representation of the path" unless the context demands otherwise.

In accordance with embodiments of the invention, a linear representation of only a portion of the path to be travelled is displayed in the display window. A representation of only a portion of the remainder of the path to be travelled may be displayed in the display window where travel along the path has commenced, or, where travel along the path has not yet commenced, a representation of only a portion of the path to be travelled is displayed. Scrolling of the displayed representation of a portion of the path in the display window in either case enables a linear representation of another portion of the path to be revealed in the display window. Thus, in embodiments, a linear representation of another portion of the path may be hidden from view. A representation of only a portion of the path is represented in the display window at a time. Of course, in some situations, e.g. toward an end of the path, a representation of the entire remainder of the path may sometimes be displayed in the display window, i.e. it may fit in. However, in contrast to prior art techniques, the present invention does not attempt to always represent an entire remainder of the path to be travelled in the display window, and this may only occasionally be the case.

The displayed portion of the representation of the path is scrollable in the display window by a user. In embodiments the displayed representation of the portion of the path is scrollable in response to a user input. The method may comprise receiving an input from a user and scrolling the displayed representation of a portion of the path in response thereto. The input may be indicative of the way in which the displayed portion is to be scrolled. Preferably the input is a touch based input, e.g. a gesture based input. The gesture may be indicative of a scrolling action. The method may further comprise a user scrolling the displayed representation of a portion of the path to reveal a linear representation of another portion of the path. The displayed portion of the representation of the path may be scrollable by the user in the display window in a direction toward the end of the path and then away from the end of the path once again, e.g. in a direction of travel and a direction opposite thereto where travel along the path is in progress. This will allow the user to explore the path and obtain an overview. The displayed linear representation of a portion of a path may be advanced automatically in the display window during travel along the path as a current position advances along the path. Such advancement would occur only in a direction of travel, and would be linked to a change in current position. It will be appreciated that in accordance with any of the embodiments described herein referring to a displayed portion being scrollable and the like, the invention extends to methods in which the scrolling step is carried out, preferably in response to a user input, and may include the step of scrolling the portion and displaying the another portion that is referred to, or any other portion according to the different embodiments discussed herein.

In accordance with the invention, the representation of the portion of the path that is displayed in the display window is selectable by the user through scrolling the displayed portion. The present invention is concerned with displaying a linear representation of a portion of a path to be travelled. The linear representation provides a schematic representation of the portion of the path. The representation may be used to facilitate visualization of the path and to convey information relating to POI or events, e.g. traffic, accidents, hazards, speed cameras, danger zones, etc, relating to the path as will be discussed below, e.g. by appropriately annotating the representation. The representation of the path to be travelled is not intended to provide an accurate path representation for use in navigation.

The representations of the portions of the path are provided in a display window of the navigation apparatus. Thus, in embodiments, the navigation apparatus comprises a display for outputting information to a user, the display including the display window displaying the linear representation. The display window herein refers to the viewing pane which defines the maximum extent of a visible portion of the path. The display window provides a frame within which the representation of a portion of the path may be scrolled. The boundary of the display window may or may not be visible to the user, and typically is not visible. At least a length, and in some embodiments also a width, of the display window may be fixed. In embodiments the method comprises scrolling the representation of the portion of the path in the display window to reveal a representation of another portion of the path while the length of the display window remains fixed. The length of the display window refers to a dimension of the display window in the direction of the path that is represented. In some embodiment the display window is rectangular. The display of the navigation apparatus may further comprise other display windows.

The linear representation of the portion of the path and/or the display window containing the linear representation of the portion of the path may extend horizontally or vertically. The linear representation of the path may be displayed along a side of the display of the navigation apparatus, e.g. of a display screen in which one or more display windows may be provided. The side may be a bottom or top edge, or more preferably one of the side edges connecting the top and bottom edges of the display. In preferred embodiments the linear representation extends vertically along one side of the display.

In preferred embodiments the method further comprises displaying a representation of a 2D or 3D navigation map simultaneously with displaying the linear representation of the portion of the path. The navigation map may provide a representation of a current position and an indication of a road on which the current position is located. Where a route has been pre-calculated, the navigation map may provide an indication of the path to be taken from the current position to follow the route. The navigation map provides a representation of the actual surroundings to facilitate navigation.

The displayed linear representation of the portion of the path and/or the display window in which the representation is displayed may be located along a side of the displayed navigation map. The side may be a bottom or top edge or more preferably one of the side edges connecting the top and bottom edges of the map. In some embodiments the linear representation extends vertically along a side of the map. In some preferred embodiments the linear representation and/or window is provided superimposed on a background image of the 2D or 3D navigation map.

The window displaying the linear representation of a portion of the path may be provided as part of a panel. The panel may include information relating to events or locations, e.g. POI, relating to the path as described below. The panel may be located relative to a display of the navigation apparatus in the same manner as the representation/display window, e.g. along a side thereof, and may be superposed on a navigation map. In this case, the panel may be configured such that the underlying map is visible over at least a part of the area of the panel. Thus at least part of the panel may be semi-transparent to allow viewing of the background map image. Where a pre-calculated route is being followed, the panel may include information regarding an estimated time of arrival, distance to destination, etc or such information might be provided in a separate panel. However, a panel may also be provided for other types of path when the path is not a pre-calculated route.

The method of the present invention may or may not be implemented during travel along the path. For example, the method might be implemented in relation to a path yet to be travelled, enabling a user to obtain an overview of the path before setting out. In preferred embodiments, however, the method is implemented during travel of a user along the path. In these embodiments the method provides the ability for a user to scroll the displayed linear representation of a portion of the path to view a representation of another portion of the path during travel along the path, and preferably the method comprises scrolling the displayed portion in response to a user input during travel along the path. The user may therefore be able to see what is coming up. The user may be able to scroll the representation of the portion of the path forward in the direction of travel and then back again. In contrast to conventional techniques in which a representation of the entire remainder of a path to be travelled is always shown during travel along the route, this avoids the need to rescale the representation as the length of the path that remains to be travelled decreases, allowing the representation of a portion of the path to be provided potentially at a larger scale, allowing more detail relating to the path and events or locations relating thereto to be shown. If the user wishes to see a representation of a different portion of the path, they may simply scroll the display. References made herein to the current position refer to the current position of the navigation apparatus and hence that of a user. Where the navigation apparatus is located in a vehicle, the current position will correspond to the current position of the vehicle. In embodiments the navigation apparatus is an in-vehicle apparatus, and can be an integrated apparatus or a removable apparatus (such as a "PND"). The user may therefore be a driver.

In some embodiments the method may comprise scrolling the representation of a portion of the path that is displayed in the display window after scrolling in response to a user input back to reveal a representation of a portion of the path that was displayed in the display window before scrolling in response to the user input. The scrolling back may be in response to a further user input, e.g. a tap, etc, or might occur automatically, e.g. after a given time of inactivity. The portion is preferably scrolled back to display a portion that includes the current position in the display window.

The path to be travelled is a path to an end point, and may be a path from a start point to an end point. The representation is of a portion of a path to be travelled, i.e. a portion of a path that has yet to be travelled, e.g. extending from or ahead of a current position where travel along the path has commenced, or any part of a path where travel along the path has not yet commenced.

In order to be able to display a linear representation of a portion of the path that is scrollable to reveal a linear representation of another portion, it is necessary to first determine the path including the portions. In some embodiments the method comprises determining the entire path. This may facilitate providing a display of a representation of a selected portion of the path which may be scrolled to display a different portion of the path in the window. A linear representation of the (entire) path may also first be determined. However, it is envisaged that rendering of the representation or even determination of the representation could be carried out as required, i.e. "on the fly", as the portion to be displayed is scrolled. Knowledge of the path is then required in order to know what to represent or render when a displayed portion is scrolled. Of course other arrangements may be envisaged, such as determining and rendering the entire path or linear representation thereof in advance. While, in embodiments the path to an end point is determined in advance, it is envisaged that other portions of the path which are to be displayed when the display is scrolled might be determined on the fly.

In some preferred embodiments the method may comprise determining a linear representation of an entire path to an end point, wherein only a portion of the linear representation of the path is displayed in the display window. In other words, a linear representation for the entire path to be travelled may be determined, of which a portion at a time is then revealed in the display window. In use, the linear representation may be scrolled within the display window to reveal different portions thereof. The method may therefore comprise the step of determining the linear representation of the (entire) path to be travelled before the step of displaying a portion thereof in the display window. In these embodiments, the linear representation is scrollable to reveal different portions thereof. Thus the linear representations of the portion of the path and the another portion of the path may form part of a linear representation of the entire path, wherein the display window is scrollable over the linear representation to reveal different portions thereof.

The path comprises, in some embodiments, a pre-calculated route to a destination, and may be such a route. The step of determining the path may comprise calculating a route to a destination, e.g. between an origin and a destination. The step may be carried out by the navigation apparatus. The route may be calculated in any suitable manner, and may be in accordance with user specified criteria, such as the fastest route, the shortest route, the most fuel efficient route, etc.

In these embodiments, the end point of the path may correspond to the destination of the pre-calculated route. Thus the path may be a pre-calculated route, and the path to the end point may correspond to the pre-calculated route from an origin, or current position along the route to the destination. However, in other embodiments the end point may be a point beyond the destination of a pre-calculated route, e.g. along a continuation of a road to the destination. This may enable information regarding locations or events relating to a path in a region beyond the destination of the pre-calculated route to be displayed as discussed in more detail below. For example, point of interest (POI), e.g. parking, information may be displayed relating to locations beyond a destination of a pre-calculated route. In some embodiments the step of determining the path may comprise calculating a route between an origin and destination to provide a first section of the path, and determining a second section of the path beyond the destination. The continuation of the path, or the second section of path, may be a continuation of a road along which the destination is located or may be a predicted path, for example. Thus, in some embodiments in which the path comprises a pre-calculated route, the end point of the path may be a destination of the pre-calculated route or a location beyond the destination. In these embodiments a start point of the path may be an origin of the pre-calculated route or a current position. The path may comprise the entire pre-calculated route or a remainder of the route to be travelled. Where the path is a pre-calculated route, the method may further comprise displaying information regarding a remaining distance, and/or estimated time of arrival etc Such information may be provided in a separate panel to a path information panel, or may be located e.g. at an end of a path information panel.

However, the present invention is not applicable only to paths in the form of or comprising pre-calculated routes. In accordance with other embodiments the path may be a route along which the user is travelling in so-called free driving, i.e. without following a pre-calculated route. In some embodiments the path is therefore a route that is not pre-calculated. The step of determining the path may comprise determining such a route. The path may be a continuation of a road along which the user is currently travelling. These embodiments are most applicable to routes in the form of roads such as highways or other major routes having a classification of greater than a given threshold, where it can be assumed that the user is likely to continue along the current road for some distance, and would be interested in upcoming events or locations along the road. Thus the route or road may be a highway or motorway. In these embodiments, the method may comprise providing the representation of the path in the display window or, where appropriate a path panel including the representation, until it is determined that the user is no longer driving along the route or road. The window and/or panel may then be hidden or otherwise no longer displayed. The path may therefore be a stretch of road from a current position on a road to an end point of the road. In embodiments, therefore, the end point may be an end point of a road e.g. highway or motorway along which the user is currently travelling or a location beyond the end of the road. In these embodiments, the representation or path panel may be provided only where there is information relating to the path ahead to be conveyed e.g. a traffic event.

In yet other embodiments, the path may be a predicted path. The method may comprise determining such a path. The predicted path may be determined using any techniques known in the art. For example, this may be based upon a favourite route of a user, e.g. as specified by the user or determined from their driving behaviour, and/or based upon a likely path analysis. The end point may therefore be an end point of a predicted path, or beyond an end of the predicted path.

The portion of the path and of the another portion of the path whose linear representations may be displayed may or may not overlap. In some embodiments a displayed linear representation of a first portion of the path is scrollable in the display window to reveal a linear representation of another portion of the path which portion overlaps with the first portion.

In accordance with the invention in any of its embodiments the displayed representation of the portion of the path may be scrollable to reveal a representation of one or more, and preferably a plurality of different portions of the path. The portions may or may not overlap. The representation of the portion of the path may be scrollable in the display window to reveal a representation of any other portion of the path to be travelled. In preferred embodiments the displayed portion of the representation of the path is scrollable in the display window to reveal linear representation of different portions over a continuous length of the path. The displayed representation of the portion of the path may be continuously scrollable in the display window over a length of the path to reveal representations of different portions of the path.

A displayed linear representation of a first portion of the path may be scrollable to reveal a linear representation of another portion of the path, wherein the linear representation of the first portion of the path is of the same length as the linear representation of the another portion of the path. Where the linear representation of the path may be scrolled to reveal linear representations of multiple other portions of the path, each portion may be of the same length. The length may be correspond to a length of the display window. In some embodiments the linear representation of the portion of the path may be scrolled to reveal linear representations of multiple other portions the path in the window, wherein every portion that may be revealed in the window is of the same length.

As will be appreciated from the above, the linear representation of the portion of the path that is displayed will typically not include the end point of the path; the displayed portion is preferably scrollable to reveal a linear representation of a portion of the path including the end point of the path and/or a representation of another portion of the path that does not include the end point. Alternatively or additionally, the linear representation of the portion of the path to be travelled displayed in the window includes the end point, and is scrollable in the display window to reveal a linear representation of a portion of the path that does not include the end point.

In embodiments in which the path comprises a pre-calculated route, and the end point comprises a destination of the route, the method may comprise displaying an indication of a destination of the route when a portion of the path including the end point is selected for display. The method may further comprise displaying a continuation of the path beyond the destination in the display window in some embodiments.

The displayed portion of the linear representation of the path is preferably scrollable in the display window while a current position of a user remains unchanged. The displayed portion of the linear representation of the path and/or the scrolling of the displayed portion does not depend upon a current position of the user.

In some embodiments the method may comprise displaying a linear representation of a first (or initial) portion of the path in the window, wherein the portion is scrollable in the display window to reveal a linear representation of a second portion of the path, the linear representation of the second portion being scrollable to display the first (or initial) portion once more.

In some embodiments the linear representation of the portion of the path displayed in the display window includes the current position and is scrollable in the display window to reveal a linear representation of a portion of the path that does not include the current position, or the linear representation of the portion of the path displayed in the display window does not include the current position and is scrollable in the display window to reveal a linear representation of a portion of the path that includes the current position. The representation of the portion of the path which includes the current position may include an indication thereof, e.g. an icon or similar.

In preferred embodiments, when the displayed linear representation of a portion of the path is scrolled to reveal the linear representation of another portion of the path, the linear representation of the another portion of the path is of the same scale as the (first or initial) portion of the path.

In accordance with the invention of any of its embodiments wherein the path comprises a pre-calculated route to a destination, the linear representation of a portion of the path is scrollable to reveal a linear representation of a portion of a path beyond the destination.

By displaying a linear representation of a portion of a path to be travelled, the present invention provides the ability to provide information relating to locations along the portion of the path to a user by displaying information associated with the corresponding location(s) represented by the linear representation. This may be achieved by appropriately annotating or enhancing the representation.

In preferred embodiments the method further comprises displaying information relating to one or more locations represented along the displayed representation of a portion of the path in association with the representation of the portion of the path, and preferably in association with the corresponding location(s) as represented by the representation. Such information is preferably displayed relating to the representation of each portion of the path that is displayed e.g. when the representation is scrolled. Thus, information is preferably displayed relating to the displayed representation of another portion of the path when revealed, and any other portion of the path, in association with the displayed representation of the another portion. The features discussed below regarding the display of information relating to the path may therefore be applied to any displayed representation of a portion of the path. The steps below described in relation to providing information in relation to one or more locations may be applied to the or each given location for which information is provided if not explicitly stated.

The information preferably comprises at least dynamic travel information. For example, the information may comprise traffic information, weather information, etc relating to the or each of the one or more locations represented along the displayed portion of the path. However, the information may also comprise non-dynamic information such as information regarding the presence of POI along or in proximity to the path.

Preferably the information relating to a given location relates to the presence of a POI or to the existence of an event or hazard associated with the location. An event or hazard may be an event or hazard affecting the location. Points of interest may include parking locations, petrol stations or safety cameras. Other types of POI may be user specified.

Preferably such information is provided graphically, e.g. using markers, icons, colouring, etc. These embodiments may be utilised in conjunction with any type of path, e.g. a pre-calculated route or a path that does not correspond to a pre-calculated route as envisaged above, e.g. being a highway or motorway along which a user is travelling, a predicted path, etc. In any of these embodiments, the information provides the user with information about what is coming up along the path being travelled, and may alert the user as to potential problems with the path.

A location in relation to which information is displayed may be a point location or an extended location, e.g. an area or zone along the path. A given location may therefore encompass a plurality of positions along the path. A given location may encompass one or more positions along a continuous portion of the representation of the path. For example, an extended stretch which is subject to surveillance using an average speed camera system may be indicated in relation to the existence of a safety camera at the location or a point location corresponding to the position of a safety camera may be indicated. Where the information relates to the presence of an event or hazard associated with a location, the location may be a stretch that is affected by the event or hazard. Each location in respect of which information is displayed is preferably a discrete location i.e. the locations may be discrete from one another. Where information is displayed in relation to multiple locations, the locations are locations associated with different information, e.g. relating to different events, hazards or POI, and may each involve a respective location that may be a point or extended location.

The method preferably comprises indicating each location represented along the displayed representation of a portion of the path with which information is associated, e.g. relating to a POI or an event or hazard associated with the location. In embodiments the location or locations are indicated by marking the representation of the location or locations along the displayed representation of the portion of the path. This may be achieved by colouring the location or locations along the portion of the path or using some other technique.

The method further comprises displaying the information relating to the location(s). The method may further comprise annotating the marked location or locations to provide the information relating to the location(s). The information relating to a location may be indicative of a type of POI, event or hazard associated with the location. In some embodiments a marker indicative of a location with which information is associated is annotated with one or more graphical elements such as symbols, e.g. icons providing the information.

Information relating to the existence of a POI may be provided even where the POI does not lie exactly on the path. In these cases the information indicative of the presence of POI will be associated with an approximate location of the POI along the path. In other cases where a POI lies on the path, the information indicative of the presence of the POI may be associated with the actual location of the POI along/on the path.

In some preferred embodiments in which a portion of a path extends beyond an end of a pre-calculated route, the method may comprise displaying information indicative of the presence of a POI associated with one or more locations along the path beyond the end of the pre-calculated route when a linear representation of the portion of the path beyond the end of the pre-calculated route is displayed. The POI in these embodiments preferably comprise parking locations.

Alternatively or additionally the method may comprise displaying information relating to an event or hazard associated with a location represented along the representation of a portion of the path. The event or hazard affects at least a portion, and preferably only a portion, of the path. The location with which the event or hazard is associated is preferably a location affected by the event or hazard and may be an extended or point location. As discussed above, the location affected by the event or hazard is preferably indicated by marking a location represented along the displayed representation of the portion of the path corresponding to the affected location. The method may further comprise displaying information relating to the event or hazard associated with the location, preferably by annotating the marked location or locations. This may be carried out in the manner described by reference to the embodiments in which information is provided relating to POI. The information is preferably provided in the form of one or more graphical elements, such as symbols, e.g. icons. The information may be indicative of the nature of the event or hazard.

In preferred embodiments the event is a traffic event. A traffic event may be an event affecting traffic flow along the path. A traffic event may be a traffic jam, incidence of congestion, lane closure, road closure, roadworks, accident, etc or any incident affecting flow. The event is typically an event of a temporary nature. The event may be of a few minutes' duration, e.g. a traffic jam, or may be a longer lasting event, such as a lane closure.

The method may comprise providing information indicative of a severity of an event or hazard. This may be indicative of a severity of an effect of a traffic event on traffic flow, e.g. a delay associated with the event, or of a risk associated with a hazard. The information may provide a quantitative and/or qualitative indication of the severity of the event or hazard. For example, the colour of a marker indicative of a location associated with the event or hazard and/or an annotation providing information relating thereto may be chosen to be indicative of a severity of the event or hazard, e.g. red for serious, amber for moderate, etc, and/or an estimated delay time may be indicated for travel along the path.

Other types of event in respect of which information may be displayed include environmental, e.g. weather, events. For example, information relating to locations affected by weather events such as storms, poor visibility conditions, heavy rainfall, high winds, icy conditions, etc may be provided. A hazard may similarly be a weather related hazard, and may be of longer duration or even a permanent hazard, e.g. an accident hotspot, adverse camber or road surface, etc.

The method may comprise receiving information relating to one or more locations along the path, e.g. relating to an event or hazard associated with a location or locations, and displaying information relating to the location or locations in association with the corresponding location or locations represented by the representation of a portion of the path. The information indicative of an event or hazard associated with the location(s) may be "live" information. The "live" information may be obtained from any suitable source or sources. Live data may be thought of as data which is relatively current and provides an indication of what is occurring along the path. Thus, the data may be "pseudo-live", in that it may not relate to exactly current conditions, but is "live" by contrast to "historical" data. The live data may typically relate to the movement of devices along the path within the last 30 minutes. In some embodiments the live data may relate to the movement of vehicles along the path within the last 15 minutes, 10 minutes or 5 minutes. The method may comprise receiving information indicative of a location or locations associated with an event or hazard and adding information relating thereto to a displayed representation of a portion of the route comprising a representation of the location or locations.

Preferably the displayed information relating to a given location represented along a displayed representation of a portion of the path comprises a user selectable option that may be selected to provide additional information, i.e. relating to the POI, event, hazard, etc associated with the location. The option is preferably selectable using a touch based command, e.g. a gesture, tap, etc. In some embodiments in which the information is indicative of the presence of a POI in proximity to a location, i.e. where the POI is not along the path, the additional information may comprise a function that may be selected to calculate a route to the POI.

In preferred embodiments the method comprises providing an indication of a distance from a current position to the closest location along the displayed representation of the portion of the path with which information is associated e.g. with which information indicative of an event, POI, etc is provided. This may provide the ability for the user to understand more readily the relative position of different locations with which information is associated along the displayed representation of the path.

In some preferred embodiments the method may comprise automatically increasing a scale of the linear representation of the portion of the path that is displayed in the display window as a given location represented along the representation of the path is approached.

The step of increasing the scale of the linear representation of the portion of the path that is displayed results in a "zooming-in" to the portion along which the given location is located. The step of increasing the scale may occur while maintaining the size of the display window, or at least a length thereof, unchanged, such that the linear representation of the portion of the path that is displayed after the scale has been increased is a representation of a shorter portion of the path than was displayed before magnification. As well as providing an alert or warning to a user regarding an upcoming event, hazard or POI, the magnification of the scale of the representation allows more detailed information regarding the event, hazard or POI to be provided.

It is believed that such methods are advantageous in their own right. Thus, from a further aspect, the present invention provides a method of providing information relating to a path to be travelled using a navigation apparatus, the method comprising:

displaying a linear representation of at least a portion of a path to be travelled using a navigation apparatus; and automatically increasing a scale of the linear representation of the path displayed as a given location represented along the path is approached.

In accordance with a further aspect the present invention provides a navigation apparatus, the navigation apparatus comprising:

means for displaying a linear representation of at least a portion of a path to be travelled; and means for automatically increasing a scale of the linear representation that is displayed as a given location represented along the path is approached.

The present invention in these further aspects may include any of the features described by reference to the earlier aspects of the invention. For example, the path or linear representation may be of any of the forms previously described, and the displayed representation may be of a portion of the path that is scrollable as discussed previously. The representation is preferably displayed simultaneously with a 2D or 3D navigation map.

Similarly, the earlier aspects of the invention may include, in embodiments using the scale increasing step, any of the features which will be described by reference to the further aspects of the invention.

Referring to the further aspects of the invention, it will be appreciated that the linear representation of the path that is displayed, at least before the step of increasing the scale, is of at least a portion of the path, and need not be of only a portion thereof, or of at least a remainder thereof, as in the earlier aspects of the invention. Likewise, the linear representation that is displayed need not be scrollable.

It will be appreciated that in the description below, references to the linear representation of "at least a portion" of the path in relation to the further aspects of the invention are equally applicable to the earlier aspects, with the removal of the "at least a" wording as those earlier aspects involve the representation of only a portion of the path. Similarly any references in the foregoing description to the representation of a portion of the path are applicable to the further aspects, other than that these may involve the representation of at least a portion of the path.

In accordance with any of the aspects or embodiments of the invention in which the scale of a representation of a path is increased upon approaching a given location, the location is preferably a location in relation to which information is displayed associated with the corresponding location as represented by the representation i.e. in association with the location as represented prior to the increase in scale. This may be in accordance with any of the embodiments described earlier. In embodiments the given location is a location associated with the presence of a POI, e.g. a safety camera, or associated with a hazard or event, e.g. a traffic event affecting traffic flow along the path, and/or is a location associated with information indicative of the presence of a POI, e.g. a safety camera, or associated with a hazard or event, e.g. a traffic event affecting traffic flow along the path.

Preferably the location is a location associated with (information indicative of) the presence of a safety camera or a traffic event affecting traffic flow along the path. An event affecting traffic flow along the path may be a traffic jam, lane closure, road closure, roadworks, or accident as described above. Most preferably, the event is a traffic jam or incidence of congestion. The information and location may be indicated in any of the manners previously discussed.

It will be appreciated that in these aspects or embodiments the scale of the representation is increased or magnified during travel along the path as a current location approaches the given location.

The given location may or may not be a point location as discussed earlier. Where the given location is not a point location, i.e. where it includes multiple positions along the path, e.g. defining a stretch along the path, the method may comprise increasing the scale of the representation when a given position along the location, e.g. an end of the location closest to a current position along the path, is approached, e.g. when a current position approaches (a position at) an end of the location or stretch. The end of the location may be a tail of an affected stretch or a traffic jam affecting the stretch. In other embodiments the given location may be a position of a safety camera or a position on a stretch under surveillance by a traffic camera, e.g. an average speed camera, closest to a current position. Of course, similar techniques may be used to result in an increase in scale by reference to any position along an extended location, not necessarily at an end thereof.

In embodiments in which the location is a location of an event affecting traffic flow, e.g. a traffic jam or incidence of congestion, the location may comprise a stretch along the path in which traffic flow is affected. In other embodiments the location may be a stretch that is under surveillance by a traffic camera. The method may comprise increasing the scale of the representation when an end of the affected stretch closest to a current position along the path is approached.

Once the scale of the linear representation of the path or portion thereof is increased, the resulting linear representation having a greater scale is displayed. The linear representation may be of a portion of the path or the portion thereof that was displayed prior to the increase in scale. A display window in which the increased scale representation is displayed is preferably at least of the same length, and preferably also width, as the display window in which the representation prior to the scale increase is displayed. Thus, it may not be possible to display the entirety of the representation of the path or portion thereof displayed prior to the increase in scale. In embodiments the linear representation of the (at least a) portion of the path that is displayed is displayed in a display window of the navigation apparatus, and the method comprises increasing a scale of the linear representation that is displayed in the display window as a given location along the path is approached. In these embodiments the display window in which the increased scale representation is displayed is the same or at least of the same size as that in which the original representation was displayed. Thus, in embodiments the representation of the path after the increase in scale that is displayed is of only a portion of the path, whether or not the representation prior to the increase in scale was of a portion of the path or of the entire path to be travelled.

The scale of the linear representation of the portion the path that is displayed is increased by comparison to the scale of the linear representation of a portion of the path that is displayed immediately before the increase in scale. In embodiments the method comprises displaying a linear representation of (at least) a portion of a path being travelled having a first scale, wherein the scale of the linear representation after the step of increasing the scale is at a second scale, the second scale being larger than the first scale.

In preferred embodiments the increase in scale is a step up in scale, i.e. a discrete increase. In other words, the increase is not gradual. The increase in scale may be a stepped increase in scale, i.e. the increase may include more than one step. However, in embodiments the increase in scale is a single discrete increase in scale. Of course, the use of a gradual increase in scale or multiple increases in scale is not excluded.

The portion of the path that is displayed after increase of the scale, i.e. that portion having the increased scale, is a portion that preferably includes the given location and preferably a current position.

Where a representation of a portion of the path to be travelled is displayed before the increase in scale, the portion preferably includes a current position, i.e. a representation of current position. The representation of the portion preferably also includes a representation of the given location. A representation of a portion of the path displayed before the increase in scale may include a representation of a portion of the path extending beyond the given location. The representation of the portion may or may not include a destination where the path is a pre-calculated route as described above.

In aspects or embodiments in which the displayed representation of the portion is scrollable, the represented portion may be a portion that has been selected by a user, and may not include a current position. In such embodiments, the method may comprise automatically scrolling the linear representation of the portion of the path that is visible in the display window to include a current position and the given location in addition to increasing the scale of the portion.

The representation of the path or portion thereof after the increase in scale includes a representation of the given location.

By magnifying the scale of the linear representation of the (at least a) portion of the path that is displayed, the users attention is drawn to the representation or window in which it is displayed. In embodiments the method comprises increasing the scale of the linear representation of the portion of the path that is displayed in the display window as a given location along the path is approached to provide an alert or warning regarding the presence of a POI, e.g. safety camera, a hazard or of an event affecting traffic flow associated with the location.

The increase in scale of the representation allows more detailed information to be provided regarding an event, hazard or POI associated with the location, and the method may comprise providing additional information relating to the location, e.g. relating to an event, hazard or POI associated with the given location, in the increased scale representation. The additional information is additional to any information displayed before the increase in scale, and may be an enhanced version of such information. The additional information is preferably provided by annotating the representation.

Where the given location is a location of a traffic event affecting traffic flow, e.g. such that the location is a stretch along which traffic flow is affected, the method may comprise displaying information associated with the increased scale representation regarding the event. The information may comprise one or more of a delay time, distance from a current position to the location e.g. jam or congested stretch or end thereof, and a severity of the event. The information may be presented graphically, e.g. using colours, etc. In accordance with the invention the given location may be marked in the larger scale representation in a similar manner to that described earlier in relation to the original scale view. The information may be provided by annotating a marked portion of the representation indicating the location.

In other preferred embodiments in which the location is a location associated with a safety camera, the method may comprise displaying information or additional information associated with the increased scale representation indicative of any one or more of a current speed, type of camera, speed limit, current speed relative to the speed limit, and distance to the location of the camera. The information may be provided in a manner similar to that described for other embodiments, e.g. involving traffic events.

The method may further comprise providing a warning or alert to the user in combination with increasing the scale of the representation when the given location is approached. This may be carried out simultaneously with the increase in scale and/or once the scale has been increased. Such embodiments are particularly applicable to locations associated with the presence of a safety camera or hazard. An audible warning or alert may be given.

In these further aspects and embodiments of the invention involving an increase in scale, the step of increasing the scale of the representation is carried out automatically, i.e. without user intervention as the given location is approached.

The method may comprise determining that a given location represented by the displayed linear representation of (at least a) portion of the path is being approached and increasing the scale of the representation in response to the determination. The step of determining that the location is being approached may comprise determining that the current position (e.g. as determined from global navigation satellites, such as GPS) is equal to or less than a predetermined distance from the location, and/or that an estimated time remaining to reach the location is equal to or less than a predetermined time. The method may comprise increasing the scale of the representation in response to such a determination. Thus, determining the approach may be based upon considering current position relative to a position of the location alone, and/or in combination with a speed of travel. A predetermined distance or time may be set as desired for a given implementation, and could be set depending upon user preferences.

In some embodiments the method comprises determining that the remaining distance or time to reach the given location has decreased at least to a predetermined distance or time, and triggering an increase in the scale of the portion of the map represented in response to said determining. The apparatus may comprise means for carrying out any of the steps described.

The method may comprise decreasing a scale of the displayed linear representation of the path once the given location has been passed (or where the location is an extended location, once the furthest position of the location along the path has been passed). The scale may be decreased automatically, i.e. without user intervention.

In some embodiments the method comprises, after the scale of the representation has been increased, receiving an input from a user indicative of a desire to decrease the scale of the representation of the path once more, and decreasing the scale of the representation in response thereto. The input may be a touch based input. In these embodiments the method preferably comprises decreasing the scale to a scale of the representation prior to the increase in scale.

The representation may or may not be scrollable to reveal a representation of another portion of the path when at the larger scale, i.e. when magnified. In some embodiments the representation is not scrollable, but may be returned to the previous non-enlarged scale to enable scrolling once more.

The principles of the present invention are applicable to any form of navigation apparatus, or indeed any location-aware mobile device. In accordance with any of the aspects or embodiments of the invention the apparatus may comprise a display for displaying a digital map to a user, a processor configured to access electronic map data and cause an electronic map to be displayed to a user via the display, and typically a user interface operable by a user to enable the user to interact with the apparatus. References to a processor may refer to a set of one or more processors. Thus, it will be appreciated that the navigation apparatus may comprise a set of one or more processors for carrying out any of the steps described. For example, the "means for" carrying out any of the steps may be a set of one or more processors.

Regardless of its implementation, a navigation apparatus used in accordance with the present invention may comprise a processor, memory, and electronic map data stored within said memory. The processor and memory cooperate to provide an execution environment in which a software operating system may be established. One or more additional software programs may be provided to enable the functionality of the apparatus to be controlled, and to provide various other functions. A navigation apparatus of the invention may preferably include Global Navigation Satellite Systems (GNSS), such as GPS, signal reception and processing functionality. The apparatus may comprise one or more output interfaces by means of which information may be relayed to the user. The output interface(s) may include a speaker for audible output in addition to the visual display. The apparatus may comprise input interfaces including one or more physical buttons to control on/off operation or other features of the apparatus.

In embodiments of the invention, the navigation apparatus is a mobile navigation apparatus, also referred to as a portable navigation device (PND). In embodiments the navigation apparatus is located in a vehicle. The current location of the navigation apparatus will therefore correspond to the current location of the user/driver and/or vehicle, as appropriate. The invention is also applicable to navigation apparatus which is provided as part of an integrated navigation system. For example the apparatus may form part of an in-vehicle integrated navigation system.

In other embodiments, the navigation apparatus may be implemented by means of an application of a processing device which does not form part of a specific navigation device. For example the invention may be implemented using a suitable computer system arranged to execute navigation software. The system may be a mobile or portable computer system, e.g. a mobile telephone or laptop, or may be a desktop system.

The present invention extends to a computer program product comprising computer readable instructions executable to perform a method according to any of the aspects or embodiments of the invention, or to cause a navigation apparatus to perform such methods.

The present invention extends to a, preferably non-transitory, computer program product comprising computer readable instructions executable when run on a navigation apparatus in accordance with any of the embodiments of the invention to cause a set of one or processors of the navigation apparatus to perform the steps of any of the aspects or embodiments of the method described herein.

It will be appreciated that any of the further aspects of the invention may include any or all of the features of the invention described in relation to any other aspects and embodiments of the invention to the extent they are not mutually inconsistent therewith.

Advantages of these embodiments are set out hereafter, and further details and features of each of these embodiments are defined in the accompanying dependent claims and elsewhere in the following detailed description.

BRIEF DESCRIPTION OF THE DRAWINGS

Some preferred embodiments of the invention will now be described by way of example only, and with reference to FIGS. 1 to 10 of which:

FIGS. 9A to 9F illustrate an embodiment in which automatic zooming occurs when a traffic jam location is approached.

DETAILED DESCRIPTION OF PREFERRED EMBODIMENTS

The description with respect to FIGS. 1 to 4 provides background information to facilitate understanding of the invention in its various embodiments. The embodiments of the invention are described by reference to FIGS. 5 to 10D.

Preferred embodiments of the present invention will now be described with particular reference to a PND. It should be remembered, however, that the teachings of the present invention are not limited to PNDs but are instead universally applicable to any type of processing device that is configured to execute navigation software so as to provide route planning and navigation functionality. It follows therefore that in the context of the present application, a navigation device is intended to include (without limitation) any type of route planning and navigation device, irrespective of whether that device is embodied as a PND, a navigation device built into a vehicle, or indeed a computing resource (such as a desktop or portable personal computer (PC), mobile telephone or portable digital assistant (PDA)) executing route planning and navigation software.

It will also be apparent from the following that the teachings of the present invention even have utility in circumstances where a user is not seeking instructions on how to navigate from one point to another, but merely wishes to be provided with a view of a given location or information about a current or upcoming location. In such circumstances the "destination" location selected by the user need not have a corresponding start location from which the user wishes to start navigating, and as a consequence references herein to the "destination" location or indeed to a "destination" view should not be interpreted to mean that the generation of a route is essential, that travelling to the "destination" must occur, or indeed that the presence of a destination requires the designation of a corresponding start location.

Figure 1:
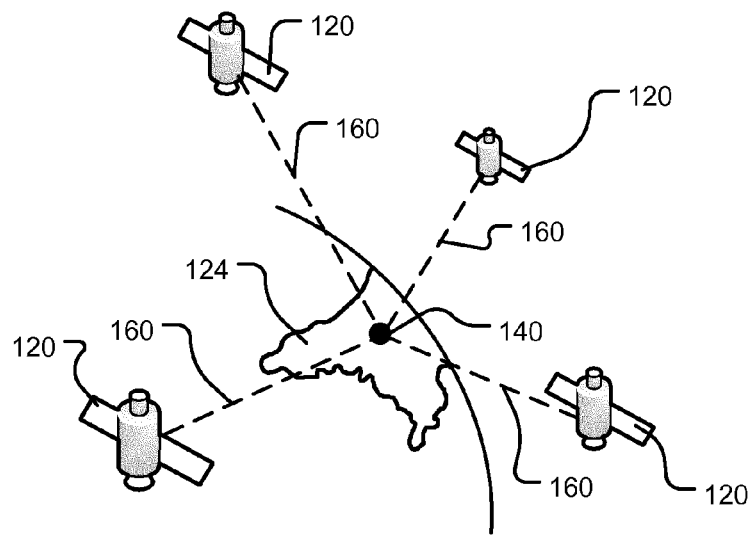
FIG. 1 is a schematic illustration of a Global Positioning System (GPS)

With the above provisos in mind, FIG. 1 illustrates an example view of Global Positioning System (GPS), usable by navigation devices. Such systems are known and are used for a variety of purposes. In general, GPS is a satellite-radio based navigation system capable of determining continuous position, velocity, time, and in some instances direction information for an unlimited number of users. Formerly known as NAVSTAR, the GPS incorporates a plurality of satellites which orbit the earth in extremely precise orbits. Based on these precise orbits, GPS satellites can relay their location to any number of receiving units.

The GPS system is implemented when a device, specially equipped to receive GPS data, begins scanning radio frequencies for GPS satellite signals. Upon receiving a radio signal from a GPS satellite, the device determines the precise location of that satellite via one of a plurality of different conventional methods. The device will continue scanning, in most instances, for signals until it has acquired at least three different satellite signals (noting that position is not normally, but can be determined, with only two signals using other triangulation techniques). Implementing geometric triangulation, the receiver utilizes the three known positions to determine its own two-dimensional position relative to the satellites. This can be done in a known manner. Additionally, acquiring a fourth satellite signal will allow the receiving device to calculate its three dimensional position by the same geometrical calculation in a known manner. The position and velocity data can be updated in real time on a continuous basis by an unlimited number of users.

As shown in FIG. 1, the GPS system is denoted generally by reference numeral 100. A plurality of satellites 120 are in orbit about the earth 124. The orbit of each satellite 120 is not necessarily synchronous with the orbits of other satellites 120 and, in fact, is likely asynchronous. A GPS receiver 140 is shown receiving spread spectrum GPS satellite signals 160 from the various satellites 120.

The spread spectrum signals 160, continuously transmitted from each satellite 120, utilize a highly accurate frequency standard accomplished with an extremely accurate atomic clock. Each satellite 120, as part of its data signal transmission 160, transmits a data stream indicative of that particular satellite 120. It is appreciated by those skilled in the relevant art that the GPS receiver device 140 generally acquires spread spectrum GPS satellite signals 160 from at least three satellites 120 for the GPS receiver device 140 to calculate its two-dimensional position by triangulation. Acquisition of an additional signal, resulting in signals 160 from a total of four satellites 120, permits the GPS receiver device 140 to calculate its three-dimensional position in a known manner.

Figure 2:
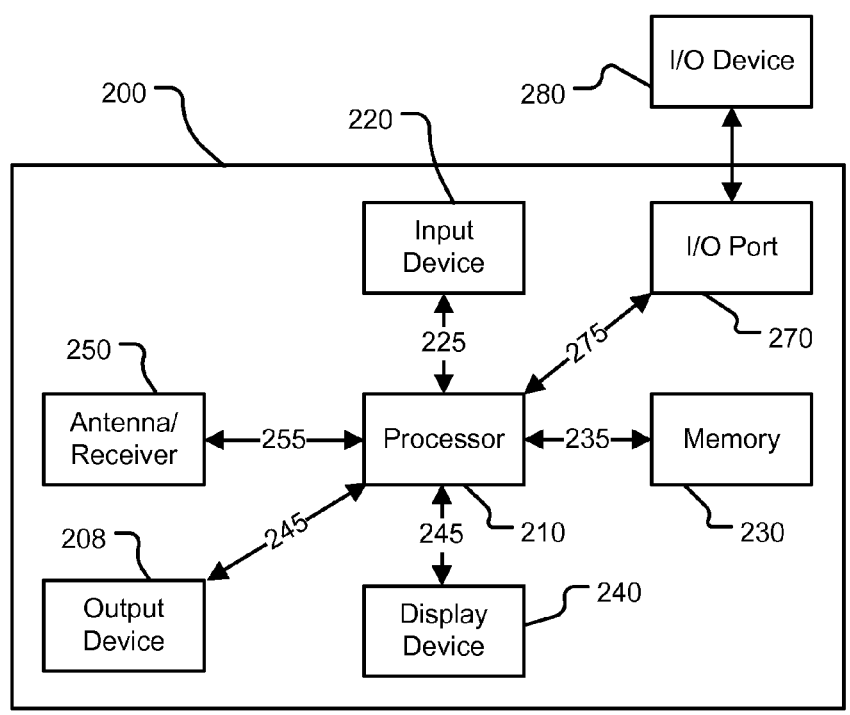
FIG. 2 is a schematic illustration of electronic components arranged to provide a navigation device.

FIG. 2 is an illustrative representation of electronic components of a navigation device 200 according to a preferred embodiment of the present invention, in block component format. It should be noted that the block diagram of the navigation device 200 is not inclusive of all components of the navigation device, but is only representative of many example components.

The navigation device 200 is located within a housing (not shown). The housing includes a processor 210 connected to an input device 220 and a display screen 240. The input device 220 can include a keyboard device, voice input device, touch panel and/or any other known input device utilised to input information; and the display screen 240 can include any type of display screen such as an LCD display, for example. In a particularly preferred arrangement the input device 220 and display screen 240 are integrated into an integrated input and display device, including a touchpad or touchscreen input so that a user need only touch a portion of the display screen 240 to select one of a plurality of display choices or to activate one of a plurality of virtual buttons.

The navigation device may include an output device 260, for example an audible output device (e.g. a loudspeaker). As output device 260 can produce audible information for a user of the navigation device 200, it is should equally be understood that input device 240 can include a microphone and software for receiving input voice commands as well.

In the navigation device 200, processor 210 is operatively connected to and set to receive input information from input device 220 via a connection 225, and operatively connected to at least one of a display screen 240 and output device 260, via output connections 245, to output information thereto. Further, the processor 210 is operably coupled to a memory resource 230 via connection 235 and is further adapted to receive/send information from/to input/output (I/O) ports 270 via connection 275, wherein the I/O port 270 is connectible to an I/O device 280 external to the navigation device 200. The memory resource 230 comprises, for example, a volatile memory, such as a Random Access Memory (RAM) and a non-volatile memory, for example a digital memory, such as a flash memory. The external I/O device 280 may include, but is not limited to an external listening device such as an earpiece for example. The connection to I/O device 280 can further be a wired or wireless connection to any other external device such as a car stereo unit for hands-free operation and/or for voice activated operation for example, for connection to an ear piece or head phones, and/or for connection to a mobile phone for example, wherein the mobile phone connection may be used to establish a data connection between the navigation device 200 and the internet or any other network for example, and/or to establish a connection to a server via the internet or some other network for example.

FIG. 2 further illustrates an operative connection between the processor 210 and an antenna/receiver 250 via connection 255, wherein the antenna/receiver 250 can be a GPS antenna/receiver for example. It will be understood that the antenna and receiver designated by reference numeral 250 are combined schematically for illustration, but that the antenna and receiver may be separately located components, and that the antenna may be a GPS patch antenna or helical antenna for example.

Further, it will be understood by one of ordinary skill in the art that the electronic components shown in FIG. 2 are powered by power sources (not shown) in a conventional manner. As will be understood by one of ordinary skill in the art, different configurations of the components shown in FIG. 2 are considered to be within the scope of the present application. For example, the components shown in FIG. 2 may be in communication with one another via wired and/or wireless connections and the like. Thus, the scope of the navigation device 200 of the present application includes a portable or handheld navigation device 200.

In addition, the portable or handheld navigation device 200 of FIG. 2 can be connected or "docked" in a known manner to a vehicle such as a bicycle, a motorbike, a car or a boat for example. Such a navigation device 200 is then removable from the docked location for portable or handheld navigation use.

Figure 3:
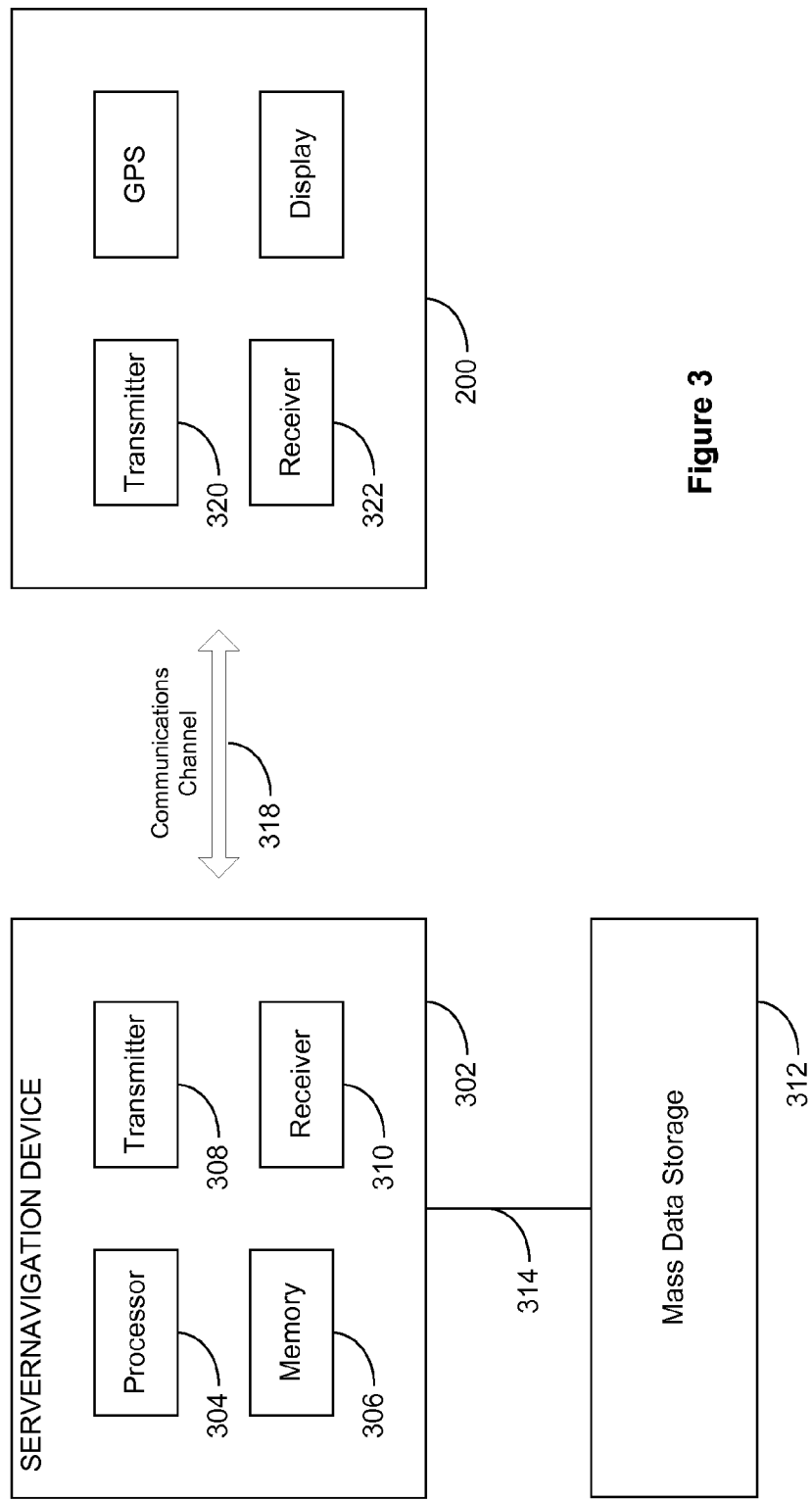
FIG. 3 is a schematic illustration of the manner in which a navigation device may receive information over a wireless communication channel.

Referring now to FIG. 3, the navigation device 200 may establish a "mobile" or telecommunications network connection with a server 302 via a mobile device (not shown) (such as a mobile phone, PDA, and/or any device with mobile phone technology) establishing a digital connection (such as a digital connection via known Bluetooth technology for example). Thereafter, through its network service provider, the mobile device can establish a network connection (through the internet for example) with a server 302. As such, a "mobile" network connection is established between the navigation device 200 (which can be, and often times is mobile as it travels alone and/or in a vehicle) and the server 302 to provide a "real-time" or at least very "up to date" gateway for information. The establishing of the network connection between the mobile device (via a service provider) and another device such as the server 302, using an internet (such as the World Wide Web) for example, can be done in a known manner. This can include use of TCP/IP layered protocol for example. The mobile device can utilize any number of communication standards such as CDMA, GSM, WAN, etc.

As such, an internet connection may be utilised which is achieved via data connection, via a mobile phone or mobile phone technology within the navigation device 200 for example. For this connection, an internet connection between the server 302 and the navigation device 200 is established. This can be done, for example, through a mobile phone or other mobile device and a GPRS (General Packet Radio Service)-connection (GPRS connection is a high-speed data connection for mobile devices provided by telecom operators; GPRS is a method to connect to the internet).

The navigation device 200 can further complete a data connection with the mobile device, and eventually with the internet and server 302, via existing Bluetooth technology for example, in a known manner, wherein the data protocol can utilize any number of standards, such as the GPRS, the Data Protocol Standard for the GSM standard, for example.

The navigation device 200 may include its own mobile phone technology within the navigation device 200 itself (including an antenna for example, or optionally using the internal antenna of the navigation device 200). The mobile phone technology within the navigation device 200 can include internal components as specified above, and/or can include an insertable card (e.g. Subscriber Identity Module or SIM card), complete with necessary mobile phone technology and/or an antenna for example. As such, mobile phone technology within the navigation device 200 can similarly establish a network connection between the navigation device 200 and the server 302, via the internet for example, in a manner similar to that of any mobile device.

For GPRS phone settings, a Bluetooth enabled navigation device may be used to correctly work with the ever changing spectrum of mobile phone models, manufacturers, etc., model/manufacturer specific settings may be stored on the navigation device 200 for example. The data stored for this information can be updated.

In FIG. 3 the navigation device 200 is depicted as being in communication with the server 302 via a generic communications channel 318 that can be implemented by any of a number of different arrangements. The server 302 and a navigation device 200 can communicate when a connection via communications channel 318 is established between the server 302 and the navigation device 200 (noting that such a connection can be a data connection via mobile device, a direct connection via personal computer via the internet, etc.).

The server 302 includes, in addition to other components which may not be illustrated, a processor 304 operatively connected to a memory 306 and further operatively connected, via a wired or wireless connection 314, to a mass data storage device 312. The processor 304 is further operatively connected to transmitter 308 and receiver 310, to transmit and send information to and from navigation device 200 via communications channel 318. The signals sent and received may include data, communication, and/or other propagated signals. The transmitter 308 and receiver 310 may be selected or designed according to the communications requirement and communication technology used in the communication design for the navigation system 200. Further, it should be noted that the functions of transmitter 308 and receiver 310 may be combined into a signal transceiver.

Server 302 is further connected to (or includes) a mass storage device 312, noting that the mass storage device 312 may be coupled to the server 302 via communication link 314. The mass storage device 312 contains a store of navigation data and map information, and can again be a separate device from the server 302 or can be incorporated into the server 302.

The navigation device 200 is adapted to communicate with the server 302 through communications channel 318, and includes processor, memory, etc. as previously described with regard to FIG. 2, as well as transmitter 320 and receiver 322 to send and receive signals and/or data through the communications channel 318, noting that these devices can further be used to communicate with devices other than server 302. Further, the transmitter 320 and receiver 322 are selected or designed according to communication requirements and communication technology used in the communication design for the navigation device 200 and the functions of the transmitter 320 and receiver 322 may be combined into a single transceiver.

Software stored in server memory 306 provides instructions for the processor 304 and allows the server 302 to provide services to the navigation device 200. One service provided by the server 302 involves processing requests from the navigation device 200 and transmitting navigation data from the mass data storage 312 to the navigation device 200. Another service provided by the server 302 includes processing the navigation data using various algorithms for a desired application and sending the results of these calculations to the navigation device 200.

The communication channel 318 generically represents the propagating medium or path that connects the navigation device 200 and the server 302. Both the server 302 and navigation device 200 include a transmitter for transmitting data through the communication channel and a receiver for receiving data that has been transmitted through the communication channel.

The communication channel 318 is not limited to a particular communication technology. Additionally, the communication channel 318 is not limited to a single communication technology; that is, the channel 318 may include several communication links that use a variety of technology. For example, the communication channel 318 can be adapted to provide a path for electrical, optical, and/or electromagnetic communications, etc. As such, the communication channel 318 includes, but is not limited to, one or a combination of the following: electric circuits, electrical conductors such as wires and coaxial cables, fibre optic cables, converters, radio-frequency (RF) waves, the atmosphere, empty space, etc. Furthermore, the communication channel 318 can include intermediate devices such as routers, repeaters, buffers, transmitters, and receivers, for example.

In one illustrative arrangement, the communication channel 318 includes telephone and computer networks. Furthermore, the communication channel 318 may be capable of accommodating wireless communication such as radio frequency, microwave frequency, infrared communication, etc. Additionally, the communication channel 318 can accommodate satellite communication.

The communication signals transmitted through the communication channel 318 include, but are not limited to, signals as may be required or desired for given communication technology. For example, the signals may be adapted to be used in cellular communication technology such as Time Division Multiple Access (TDMA), Frequency Division Multiple Access (FDMA), Code Division Multiple Access (CDMA), Global System for Mobile Communications (GSM), etc. Both digital and analogue signals can be transmitted through the communication channel 318. These signals may be modulated, encrypted and/or compressed signals as may be desirable for the communication technology.

The server 302 includes a remote server accessible by the navigation device 200 via a wireless channel. The server 302 may include a network server located on a local area network (LAN), wide area network (WAN), virtual private network (VPN), etc.

The server 302 may include a personal computer such as a desktop or laptop computer, and the communication channel 318 may be a cable connected between the personal computer and the navigation device 200. Alternatively, a personal computer may be connected between the navigation device 200 and the server 302 to establish an internet connection between the server 302 and the navigation device 200. Alternatively, a mobile telephone or other handheld device may establish a wireless connection to the internet, for connecting the navigation device 200 to the server 302 via the internet.

The navigation device 200 may be provided with information from the server 302 via information downloads which may be periodically updated automatically or upon a user connecting navigation device 200 to the server 302 and/or may be more dynamic upon a more constant or frequent connection being made between the server 302 and navigation device 200 via a wireless mobile connection device and TCP/IP connection for example. For many dynamic calculations, the processor 304 in the server 302 may be used to handle the bulk of the processing needs, however, processor 210 of navigation device 200 can also handle much processing and calculation, oftentimes independent of a connection to a server 302.

As indicated above in FIG. 2, a navigation device 200 includes a processor 210, an input device 220, and a display screen 240. The input device 220 and display screen 240 are integrated into an integrated input and display device to enable both input of information (via direct input, menu selection, etc.) and display of information through a touch panel screen, for example. Such a screen may be a touch input LCD screen, for example, as is well known to those of ordinary skill in the art. Further, the navigation device 200 can also include any additional input device 220 and/or any additional output device 241, such as audio input/output devices for example.

Figure 4:
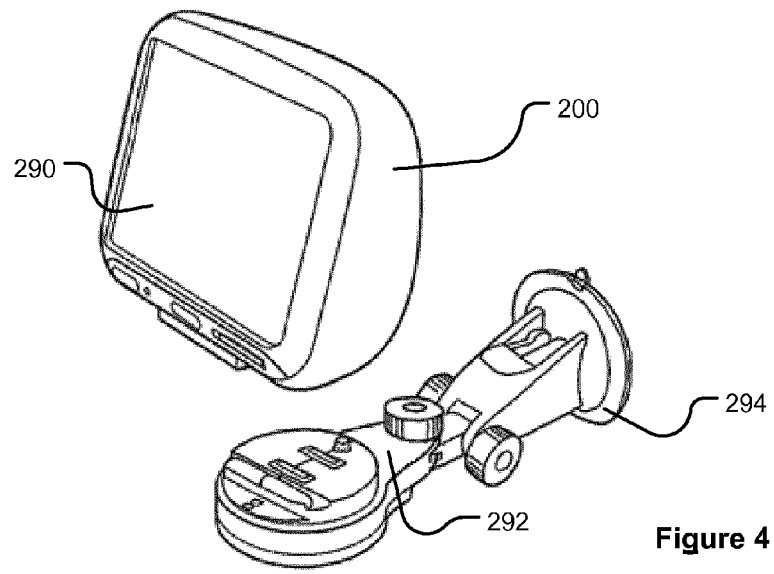
FIG. 4 are illustrative perspective views of a navigation device.

FIG. 4 is a perspective view of a navigation device 200. As shown in FIG. 4, the navigation device 200 may be a unit that includes an integrated input and display device 290 (a touch panel screen for example) and the other components of FIG. 2 (including but not limited to internal GPS receiver 250, microprocessor 210, a power supply, memory systems 230, etc.). The navigation device 200 may sit on an arm 292, which itself may be secured to a vehicle dashboard, window, etc using a suction cup 294. This arm 292 is one example of a docking station to which the navigation device 200 can be docked. The navigation device 200 can be docked or otherwise connected to an arm 292 of the docking station by snap connecting the navigation device 292 to the arm 292 for example. To release the connection between the navigation device 200 and the docking station, a button on the navigation device 200 may be pressed, for example. Other equally suitable arrangements for coupling and decoupling the navigation device to a docking station are well known to persons of ordinary skill in the art.

Figure 5:
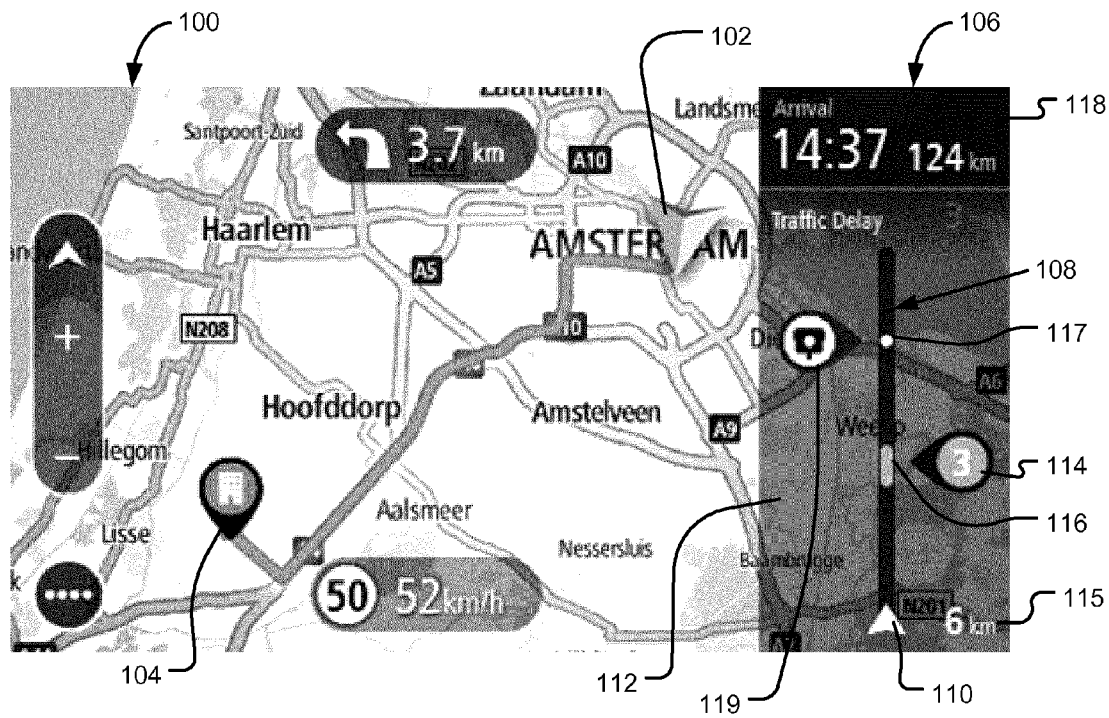
FIG. 5 illustrates a "route bar" superimposed on a 2D map view in accordance with one embodiment of the invention.

Referring now to FIG. 5, the display of a PND is shown. As known in the art, the display includes a 2D navigation map view. This navigation map view 100 provides an overview of a route being followed. In this case, the route is a pre-calculated route which is shown in a different colour superimposed on the map extending between a current position indicator 102 in the form of a chevron, and a destination icon 104. The navigation map view is conventional, and will not be described in further detail. It will be appreciated that rather than being a 2D map view, the map view might be a 3D map view. The present invention as will be described may equally be implemented with such a 3D map view.

The current invention relates to a path (or "route") bar 106, which is located to the right hand side of the navigation map view shown in FIG. 5. The path bar is in the form of a rectangular panel, and contains a linear representation 108 of a portion of the pre-calculated route being followed. Thus in this case, the path is the pre-calculated route. The linear representation of the route is a schematic representation, and in this case originates with the current position, which is shown by an icon in the form of a path bar chevron 110. The path bar 106 includes a display window 112 in which the portion linear representation of a portion of the route to be travelled is displayed. It may be seen that the portion of the linear representation visible in the display window 112 of the path bar 106 does not extend to the destination. In other words, a representation of only a part of the route to be travelled is visible in the display window 112.

As the user makes progress along the route, the representation of the route is automatically advanced, whilst maintaining the same scale, except under certain circumstances which are described below.

It may be seen that the linear representation of the portion of the route that is visible in the display window 112 of the path bar 106 in FIG. 5 is annotated with certain graphic elements. An element 114, in the form of a balloon is provided with a number "3" therein. The balloon points to a marker 116 which extends along a small portion of the length of the representation of the path that is visible in the display window 112, thereby marking a location in the form of a stretch of the path. This indicates the existence of a traffic jam in the marked region, with the length of the marker 116 indicating the length of the traffic jam. The balloon 114 provides further information about the traffic jam, including the associated delay, in minutes. The marker 116 and balloon 114 may be shaded an appropriate colour to indicate a severity that is moderate i.e. a moderately long delay.

A further location represented along the visible portion of the representation in the window 112 is marked at 117. This is a point location. A balloon 119 points to this marker 117, and contains an icon indicative of a safety camera. This indicates that at the marked position 117, a safety camera is present along the route being travelled.

At the bottom of the path bar is indicated a distance of 6 km in the region 115. This designates the distance to the first incident/POI marked on the path bar, in this case the traffic jam indicated at the marker 114.

As the route is a pre-calculated route, additional information is provided in a bar 118 extending across the top of the path bar. This includes the estimated time of arrival, and distance to destination. A total delay figure for the route is shown just under the additional route information 118.

In this case, the path bar 106 is provided as a semi-transparent panel to allow the underlying 2D navigation map to be seen.

In the embodiment of FIG. 5, the path bar 106 relates to a pre-calculated route including an origin and destination. However, in accordance with the invention a similar path panel may be provided including a linear representation of a path which does not comprise a pre-calculated route. This would be of a similar construction to that in FIG. 5, but would be concerned with a path other than a pre-calculated route. For example, in the case where a driver was travelling along a highway or motorway, the path may simply be a continuation of the motorway or highway which was being travelled.

Although not shown in FIG. 5, the linear representation 108 of the route being travelled may be scrolled within the display window 112 to reveal other portions thereof beyond that which is shown in FIG. 5. For example, a user could scroll the visible portion of the representation of the route to reveal a portion which includes the destination, or even a point along a path extending beyond the destination. These other portions of the route may similarly be annotated with information indicative of traffic jams, safety cameras and other POI or events related to travel along the route. More detail of this feature of the invention will be described below.

Certain features of the path panel 106 will now be described in more detail by reference to FIGS. 6, 7 and 8.

Figure 6:
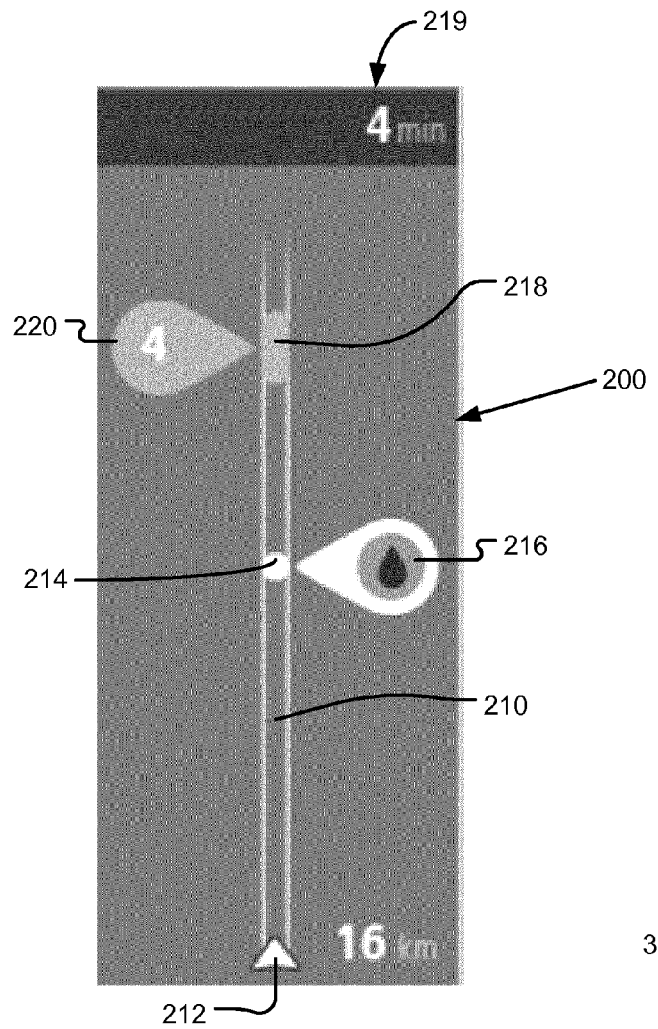
FIG. 6 illustrates a "route bar" for a path that is not pre-calculated.

Referring to FIG. 6, a path bar 200 is shown. This path bar 200 would be superimposed along the edge of a navigation map, which might be a 2D or 3D map view, in a similar manner to that shown in FIG. 5.

Similar to the path bar 106 of FIG. 5, the path bar 200 includes a linear representation 210 of a path being travelled starting from a current position 212. In this case the path is not a pre-calculated route. The path that is represented is a continuation of a currently travelled highway or motorway. In this example, the end of the highway lies within the display window containing the representation of the path, as indicated by the end of the representation furthest from the current position indicator 212 fading out. If this were not the case, then, as with the FIG. 5 embodiment, the portion of the representation of the path that could be seen in the display window would not extend to the end of the path, and the path could be scrolled in the window to reveal another portion closer to or including the end of the path, as will be described in more detail later.

Once the end of the highway, and hence path, is reached, it is envisaged that the path bar may cease to be shown. The path bar may appear automatically because there is information to be conveyed relating to locations along the path, e.g. traffic delays.

As in the path bar of FIG. 5, the path bar of FIG. 6 includes indications of various points of interest (POIs) or traffic jams associated with locations along the path. In this case, an indication of a POI in the form of a petrol station is provided by means of a marker 214 indicating the location of the petrol station along the path, and an associated balloon 216 including an icon indicative of a petrol station. Further along the route a location in the form of an extended stretch 218 is marked indicating a traffic jam, and a balloon 220 with an associated marker provides information regarding the severity of the delay associated with the jam. In this case, a 4 minute delay in travel time is indicated. The marker and balloon 218, 220 may be coloured amber to indicate moderate severity of the traffic jam.

Once again, at the top of the path bar a panel 219 is provided indicating the total delay associated with the journey. As this is not a pre-planned route, the panel 219 does not include an estimated arrival time, or distance to destination. Again, the distance to the first marker 216 is indicated at the bottom of the bar, in this case being 16 km.

During travel along the path, as the current position gets closer to the first marker 214 and its associated balloon, the marker and balloon will continue to be shown until the current position indicator 212 touches the marker 216. At that point the marker 214 and balloon 216 will disappear. The distance to the next marker 218 and balloon 220 will be indicated at the bottom of the path bar.

Figure 7:
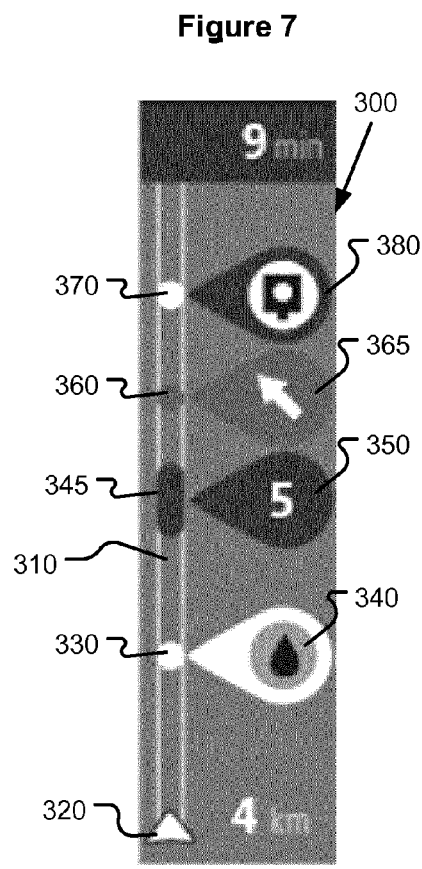
FIGS. 7 and 8 illustrate an embodiment in which a "route bar" is scrollable in accordance with the invention.
Figure 8:
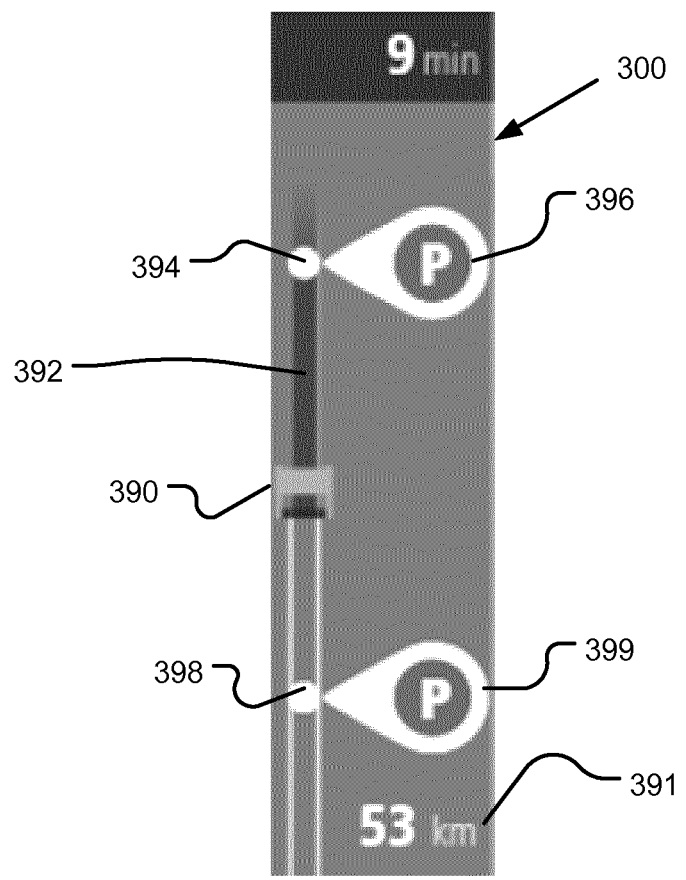

Referring now to FIGS. 7 and 8, the way in which the path bar of the present invention may be scrolled will be described.

FIG. 7 indicates a path bar similar to that shown in FIGS. 5 and 6. However, this path bar 300 is in respect of a pre-calculated route having an origin and a destination. FIG. 7 shows a portion of the linear representation of the route extending from a current position 320. It may be seen that the entire route to the destination is not visible, and the destination may not be seen in a display window of the path bar 300.

The path bar 300 includes a linear representation 310 of a portion of the pre-calculated route. The portion of the route which is represented is constrained by the size of a display window of the path bar in which the representation is displayed.

Once again, the path bar 300 includes position markers and associated balloons designating the position of further points of interest, and traffic events along the path. In this case a marker 330 indicates the location of a petrol station on the representation of the path, and is labelled by a balloon 340 which includes a icon indicative of a petrol station. Further along the route an extended stretch 345 is marked, and associated with a balloon 350. This balloon indicates a 5 minute delay associated with a traffic jam along this stretch. The balloon 350 and marker 345 may be colour coded to indicate a moderate traffic jam.

An additional marker of a different type 360 and an associated balloon 365 are provided in this embodiment. The marker 360 indicates the position at which an alternative route could be taken, and the balloon 365 indicates that the driver should carry out a left turn manoeuvre in order to follow this alternative route. Finally, marker 370 and balloon 380 indicate the presence of a safety camera. An overall delay of 9 minutes is shown for this route, and a distance of 4 km to the first marker 330 from the current position 320.

In this embodiment, and those of FIGS. 5 and 6, if the user wishes to obtain further information about any of the events or POI or the alternative path indicated than this may be done by selecting the associated balloon, e.g. by tapping it. For example, where a POI is in proximity to, rather than at the marked location, an option may be presented to calculate a route thereto.

FIG. 8 illustrates the path bar 300 of FIG. 7 after a user has interacted with it to scroll the representation of the portion of the path that is visible in the display window of the path bar 300. Here scrolling has been carried out to reveal a portion which includes the destination 290. It may be seen that the current position 320 is no longer visible in the viewing window, and the scale of the new representation is still the same as that of FIG. 7.

It is notable that scrolling of the representation of the portion of the path that is visible in the display window is possible to reveal a representation of a portion of the path extending beyond the destination 390 of the pre-calculated route. In this case, a continuation of the highway which is being followed at the destination 390 is represented in the portion 392 of the path. This enables the position of a possible parking spot beyond the destination to be shown. This parking spot is indicated as a POI by the marker 394 and associated balloon 396. Another parking spot is indicated by the marker 398 and associated balloon 399 along the representation of the portion of the path that corresponds to a pre-calculated route prior to the destination. Selecting the balloon 396 to obtain further information about the parking spot, may bring up an option allowing the user request that a route be calculated to the parking spot which lies beyond the destination of the route.

At the bottom of the path bar is given an indication that the distance from the current position to the first marker 398 is 53 km. This is provided in the region 391 of the bar. In a similar manner to that described by reference to FIG. 6, the representation of the path beyond the destination may continue up until the end of the road currently being travelled. An overall delay for the entire journey is 9 minutes is indicated, which will be the same as that shown in FIG. 7 as it relates to the route as a whole.

Accordingly, in embodiments in the invention, a path bar is provided which includes a representation of a path. A user is able to scroll the representation in a display or viewing window of the path bar to reveal a representation of another portion of the path. In the case where the path comprises a pre-calculated route, it may be possible to scroll to reveal a portion of the path which includes a destination of the pre-calculated route and a continuation of the path beyond that destination.

Scrolling of the path bar may be achieved using an appropriate input by the user. This is preferably achieved using a touch based input, such as a gesture, e.g. a tap, drag or swipe.

The extent to which the scrolling may be possible for a given path, particularly where there is no defined end to the path, might be limited to the point where a last marker along the path is within the display window An indication of distance to the first marker may be hidden during scrolling, and may become visible once more once scrolling has finished. The user may be able to return to the original view, including the current position, after desired scrolling using a quick shortcut, e.g. by making a particular input such as a tap and hold input.

It is envisaged that a path bar may, in situations other than when a route is planned, appear only when information relating to the path ahead exists, e.g. where traffic information is received indicating a problem ahead with an area of congestion or similar, or where there is other dynamic information associated with locations along the path to be conveyed.

It is necessary to determine a scale for the representation of the path that is displayed in the display window of the path bar, and which is scrollable maintaining the same scale in the manner already described. This can be calculated in any suitable manner based upon the length of the path, e.g. the length of any pre-calculated route or a continuation of the highway that is currently being travelled or another inferred route, and may also take into account the number of traffic events, POIs, or other features, e.g. alternative routes, that need to be communicated to the driver by annotating the representation of the path.

In order to be useful, the minimum distance covered by a portion of the representation that is visible in the display window at any given time might be chosen to correspond to a distance that can be travelled in an hour based on an average speed of travel or some other measure. In some situations, a new scale might be determined during travel along the path, for example where a large number of new traffic events arises after the navigation along the route begins, in relation to which information needs to be provided, and that are close together. However, it is envisaged that in many cases, a new traffic event or similar may be added to the representation without needing to change its scale.

Some further features of the path bar of the present invention will now be described by reference to FIGS. 9A to 9F, and FIGS. 10A to 10D.

Referring now to FIG. 9A, a path bar similar to that shown in FIG. 6 is shown. This path bar includes a linear representation of a portion of a path being travelled, in this case which is not part of a pre-planned route. The portion of the path that is shown commences with current position 400. The first marker associated with this linear representation 402 is the marker 404 and associated balloon 406, which indicate a traffic jam associated with a 5 minute delay. According to the information provided in the bottom corner 407 of the bar, this marker 404 is coming up in 1 km from the current position.

At this point, an automatic zoom function is triggered, as the current position has come within a pre-determined distance, this time set as 1 km, from the start of the traffic jam indicated by marker 400. The view is then changed to that shown in FIG. 9B, which is a magnified view of the portion of the representation of the path that is includes the current position and the location of the traffic jam indicated by marker 404. Additional information about the traffic jam is provided, including the position of the start of the traffic jam 408 relative to the current position 400. The start of the traffic jam is indicated by a tail end of a red or darker shaded region representing the traffic jam. A large icon 410 is now provided indicating the nature of the problem, i.e. a traffic jam, and an enlarged representation of the 5 minute delay associated with the traffic jam is present. It may be seen that at this point, the current position is indicated in the region 407 as being 270 m from the start of the traffic jam, measured to the position 408 at the tail of the jam.

FIG. 9C indicates the path bar when the current position 400 is located within the traffic jam. The representation of the path ahead is shaded dark in the region 440, and may be red in use, indicating that the user is in traffic. Now, the distance indicator 407 indicates the remaining distance of the traffic jam to be traversed, being 1.6 km, rather than a distance to the start of the traffic jam. The traffic jam icon and 5 minute delay time is still displayed, and the total delay associated with the route has increased to 12 minutes.

In FIG. 9D the path bar is shown when the user is nearing the end of the traffic jam. Here it may be seen that the current position 400 is nearing a region along the length of the path representation where the dark shading 440 indicating the traffic jam transitions to a lighter grey 430. Now the region 407 indicates that only 200 meters of traffic jam remain.

In FIG. 9E, the view has returned to the original scale of FIG. 9A, which was used before the current position reached the pre-determined 1 km distance from the start of the traffic jam triggering the increase in scale. The path bar has automatically zoomed out once the end of the traffic jam was reached. Now another region of congestion is indicated by the balloon 442 and the marker 444, being associated with a 7 minute delay. There is an indication in the region 407 that this will be in 3 km from now. In FIG. 9E the total delay time has been decreased by 7 minutes, as the 5 minute delay associated with the first jam has already been incurred.

FIG. 9F illustrates the view which will be provided if the user were to make a suitable input, e.g. tap the display, when in the traffic jam, i.e. when the display was as shown in FIG. 9C. It may be seen that this will cause the view to be zoomed out once more to provide the overview of the path being travelled, similar to that of FIG. 9A, indicating that the current position 400 is located within the traffic jam indicated by marker 404 and balloon 406. The user might carry out this operation in order to zoom out and enable scrolling of the representation of the path once again.

A further embodiment will now be described by reference to FIGS. 10A-D. This embodiment is similar to that described by reference to traffic jam in FIGS. 9A-F, but this time is concerned with providing information regarding the position of a safety camera.

Figure 10A:
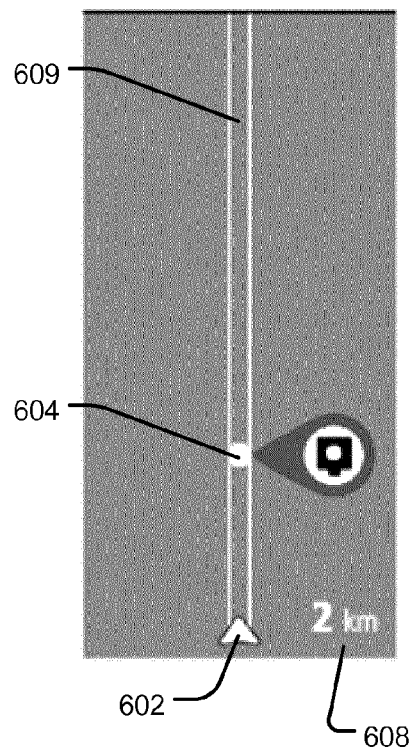
FIGS. 10A to 10D illustrate an embodiment in which automatic zooming occurs when a safety camera location is approached.

FIG. 10A illustrates a path bar of the type described with reference to FIGS. 7 and 8. The current position is indicated at 602 and a marker 604 indicates the presence of a speed camera indicated by balloon 606 coming up. This is at 2 km from the current position as indicated in the region 608. As in the earlier embodiment, the path bar provides a linear representation 609 of a part of the route being followed, but does not shown the entire route to the destination. In this view, a user could scroll the representation within the display window to reveal other portions closer to the destination.

Figure 10B:
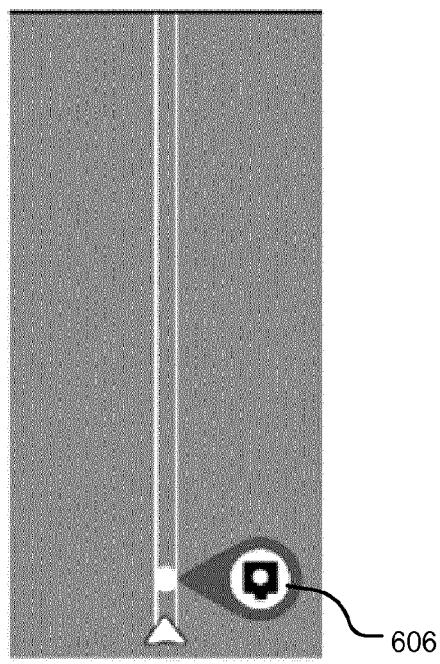

FIG. 10B illustrates the appearance of the path bar when a current position 602 has become yet closer to the marker 604 and balloon 606 indicating the presence of a speed camera at the marked location along the path. Here the distance to the speed camera is no longer given.

Figure 10C:
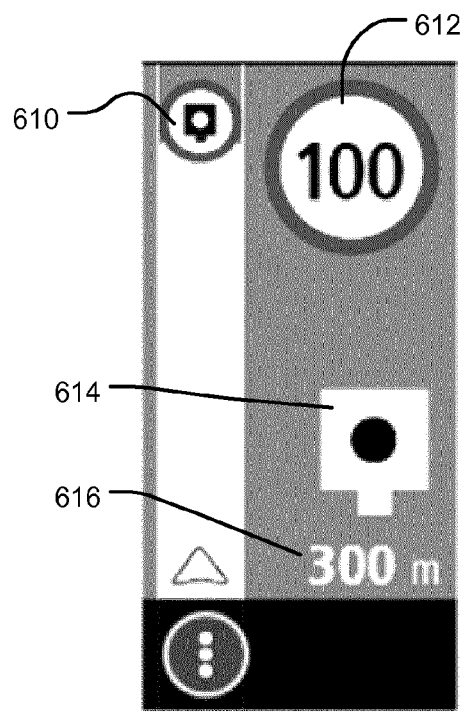

FIG. 10C illustrates the path bar when the current position 602 is now only 300 m from the location of the speed camera. At this point automatic zooming has been triggered. The zooming is triggered based on the distance and also a speed of travel of the driver, and in this case is triggered when it is determined that it would take ten seconds for the user to reach the speed camera based on current speed of travel. Of course this time could be set as desired, and alternatively a distance could be used to trigger the zoom mode as described in the earlier traffic jam embodiment. At this time a warning sound may also be played.

In the zoomed mode shown in FIG. 10C, the path bar includes additional information regarding the speed camera. A camera icon 610 is provided at the relevant position on the representation of the road ahead. An icon 612 is provided indicating the speed limit. The approach to the speed camera is coloured differently in a light grey shade. An icon 614 is present indicating a type of speed camera, and the distance to the speed camera is indicated in the region 616.

In addition there may also be options in a menu behind the path bar to remove or confirm the existence of the camera.

Figure 10D:
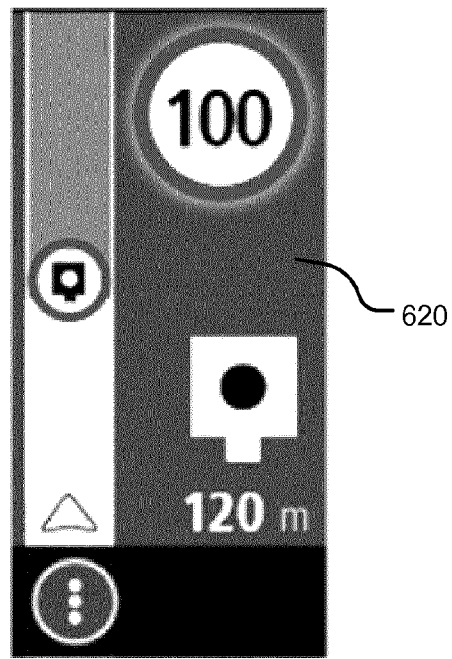

Referring now to FIG. 10D, if the user is exceeding the allowed speed limit at the time when the scale increase is triggered, a warning may be enhanced. This may be done in a number of ways. In the illustrated view of FIG. 10D, a background in the region 620 has been made darker, and would be red rather than grey in one implementation. The speed limit icon 612 might be made to flash or otherwise might be highlighted. A different warning sound might be made.

Once the speed camera has been passed, the path bar may return to its original scale as shown in FIG. 10A or 10B, i.e. automatic zooming out may occur. There may be some delay before this is implemented, for example 3 seconds after the camera location has been passed, as this may allow a user to interact with the PND to indicate that the camera was not present if appropriate after passing the location where the camera was indicated.

As described by reference to FIGS. 9A to 9F the user might tap the path bar when in the zoom mode of FIG. 10C or 10D to reinstate the normal non-zoom view along the lines of FIG. 10A or 10B. The user could then instigate scrolling once again to see the representation of another part of the path being followed in the display window.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings), may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of any foregoing embodiments. The invention extends to any novel one, or any novel combination, of the features disclosed in this specification (including any accompanying claims, abstract and drawings), or to any novel one, or any novel combination, of the steps of any method or process so disclosed. The claims should not be construed to cover merely the foregoing embodiments, but also any embodiments which fall within the scope of the claims.

The invention claimed is:

1. A method of providing information relating to a path being travelled using a navigation apparatus, the method comprising:
    displaying a linear representation of at least a portion of a path being travelled in a display window of the navigation apparatus;
    determining that a current position of the navigation apparatus is a predetermined distance or estimated time from a given location on the path;
    automatically increasing a scale of the displayed linear representation of the path in response to the determination, so as to display, based on the given location, a zoomed-in portion of the path being travelled as the linear representation; and automatically decreasing the scale of the displayed linear representation of the path once the given location has been passed.

2. The method of claim 1, wherein the given location is indicative of the presence of a speed limit enforcement device, such as a safety or speed camera.

3. The method of claim 2, comprising displaying information representing the location of the speed limit enforcement device along the path before the step of increasing the scale of the linear representation, and displaying additional information relating to the speed limit enforcement device after the step of increasing the scale.

4. The method of claim 1, comprising, after increasing the scale, displaying information indicative of one or more of a current speed, type of speed limit enforcement device, speed limit, current speed relative to the speed limit, and distance to the speed limit enforcement device.

5. The method of claim 1, wherein the given location is indicative of the presence of a hazard or traffic event affecting traffic flow along the path.

6. The method of claim 5, comprising displaying information representing the location of the hazard or traffic event along the path before the step of increasing the scale of the linear representation, and displaying additional information relating to the hazard or traffic event after the step of increasing the scale.

7. The method of claim 5, comprising, after increasing the scale, displaying information indicative of one or more of a delay time, distance from a current position to the given location or a severity of the event.

8. The method of claim 1, wherein the linear representation of the portion of the path displayed after the step of increasing the scale includes a representation of a current position of the navigation apparatus and the given location.

9. The method of claim 1, comprising, after the scale of the linear representation has been increased and before the given location has been passed, receiving an input from a user indicative of a desire to reduce the scale of the linear representation of the path, and decreasing the scale of the linear representation in response thereto.

10. The method of claim 1, further comprising providing an audible and/or haptic warning or alert to the user in combination with increasing the scale of the linear representation when the given location is approached.

11. The method of claim 1, wherein the navigation apparatus is a portable navigation device (PND) or forms part of an integrated navigation system.

12. A navigation apparatus, comprising at least one processor and a memory including computer readable instructions that, when executed by the at least one processor, cause the navigation apparatus to:
  display a linear representation of at least a portion of a path to be travelled in a display window on a display device of the navigation apparatus;
  determine that a current position of the navigation apparatus is a predetermined distance or estimated time from a given location on the path;
  automatically increase a scale of the displayed linear representation of the path in response to the determination, so as to display, based on the given location, a zoomed-in portion of the path being travelled as the linear representation; and
  automatically decrease the scale of the displayed linear representation of the path once the given location has been passed.

13. The navigation apparatus of claim 12, wherein the navigation apparatus is a portable navigation device (PND) or forms part of an integrated navigation system.

14. A non-transitory computer readable medium which stores a set of instructions which when executed performs a method of providing information relating to a path being travelled using a navigation apparatus, the method executed by the set of instructions comprising:
  displaying a linear representation of at least a portion of a path being travelled in a display window of the navigation apparatus;
  determining that a current position of the navigation apparatus is a predetermined distance or estimated time from a given location on the path;
  automatically increasing a scale of the displayed linear representation of the path in response to the determination, so as to display, based on the given location, a zoomed-in portion of the path being travelled as the linear representation; and
  automatically decreasing the scale of the displayed linear representation of the path once the given location has been passed.

15. The navigation apparatus of claim 12, wherein the linear representation of the portion of the path being displayed is the portion of the path from a current location to a destination.

16. The navigation apparatus of claim 12, wherein the linear representation of the portion of the path being displayed is a portion of the path from a current location to a destination.

* * * * *

UNITED STATES PATENT AND TRADEMARK OFFICE
CERTIFICATE OF CORRECTION

PATENT NO. : 9,739,632 B2
APPLICATION NO. : 14/436521
DATED : August 22, 2017
INVENTOR(S) : Cornelis Klaas van Dok and Sijtse Thomas Goverts Page 1 of 1

It is certified that error appears in the above-identified patent and that said Letters Patent is hereby corrected as shown below:

In the Claims

Claim 15 should read as follows:
The method of claim 1, wherein the linear representation of the portion of the path is displayed simultaneously with and separately from a 2D or 3D navigation map in the display window of the navigation apparatus.

Signed and Sealed this
Thirty-first Day of July, 2018

Andrei Iancu
*Director of the United States Patent and Trademark Office*